United States Patent
Soffer

(10) Patent No.: US 11,334,173 B2
(45) Date of Patent: May 17, 2022

(54) SYSTEM AND METHOD OF POLYCHROMATIC IDENTIFICATION FOR A KVM SWITCH

(71) Applicant: HIGH SEC LABS LTD., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 0 days.

(21) Appl. No.: 17/147,963

(22) Filed: Jan. 13, 2021

(65) Prior Publication Data

US 2022/0011874 A1    Jan. 13, 2022

Related U.S. Application Data

(63) Continuation-in-part of application No. 16/926,795, filed on Jul. 13, 2020, now Pat. No. 10,922,246.

(51) Int. Cl.
*G06F 3/023* (2006.01)
*G06F 13/42* (2006.01)
(Continued)

(52) U.S. Cl.
CPC ............ *G06F 3/023* (2013.01); *G06F 3/0202* (2013.01); *G06F 3/0238* (2013.01);
(Continued)

(58) Field of Classification Search
CPC ...... G06F 3/023; G06F 3/0202; G06F 3/0238; G06F 13/4282; G06F 13/4022;
(Continued)

(56) References Cited

U.S. PATENT DOCUMENTS 6,324,605 B1    11/2001 Rafferty
6,388,658 B1    5/2002 Ahern
(Continued)

FOREIGN PATENT DOCUMENTS

CA    2659480    9/2010
CN    104699615    6/2015
(Continued)

OTHER PUBLICATIONS

Secure Ultra High Def DP/HDMI to DP/HDMI KVM Switch User Manual; Belkin International, Inc.; 2018. (Year: 2018).*
(Continued)

*Primary Examiner* — Glenn A. Auve
(74) *Attorney, Agent, or Firm* — Browdy and Neimark, PLLC

(57) ABSTRACT

A peripheral devices switch, a peripheral device, and a keyboard configured to be connected to a plurality of host computers. The peripheral devices switch configured to be coupled to at least one set of peripheral devices and to a plurality of host computers. A color is assigned to each host computer and the at least one set of peripheral devices illuminates at least one polychromatic light source with the color that is assigned to an active host computer. A peripheral device interface to interface between the peripheral device and the peripheral devices switch may be a composite interface comprises two independent interface protocols either by sharing a single connector and cable but having separate pins in the connector and corresponding wires in the cable, or by having a separate cable and separate connector to each one of said interface protocol. The composite interface comprises a primary standard peripheral device interface for the standard peripheral device functionalities, and secondary dedicated peripheral device interface configured to instructs the illumination of the polychromatic indication.

33 Claims, 10 Drawing Sheets

(51) Int. Cl.
*G08B 5/36* (2006.01)
*G06F 3/02* (2006.01)
*G06F 13/40* (2006.01)
*G06F 3/16* (2006.01)

(52) U.S. Cl.
CPC ...... *G06F 13/4022* (2013.01); *G06F 13/4282* (2013.01); *G08B 5/36* (2013.01); *G06F 3/16* (2013.01); *G06F 2213/0042* (2013.01); *G09G 2370/24* (2013.01)

(58) Field of Classification Search
CPC .............. G06F 3/16; G06F 2213/0042; G09G 2370/24; G08B 5/36
See application file for complete search history.

(56) References Cited

U.S. PATENT DOCUMENTS

| | | | |
|---|---|---|---|
| 6,559,833 B2 | 5/2003 | Rowe | |
| 6,578,089 B1 | 6/2003 | Simpson et al. | |
| 6,671,756 B1 | 12/2003 | Thomas et al. | |
| 6,738,080 B1 | 5/2004 | Dash et al. | |
| 6,820,160 B1 | 11/2004 | Allman | |
| 7,028,110 B2 | 4/2006 | Seki et al. | |
| 7,113,978 B2 | 9/2006 | Beasley et al. | |
| 7,240,111 B2 | 7/2007 | Vanharlingen et al. | |
| 7,284,278 B2 | 10/2007 | Anson et al. | |
| 7,320,071 B1 | 1/2008 | Friedman et al. | |
| 7,333,031 B1 | 2/2008 | Bantner | |
| 7,478,235 B2 | 1/2009 | England et al. | |
| 7,502,878 B1 | 3/2009 | Wright | |
| 7,559,092 B2 | 7/2009 | Anson et al. | |
| 7,568,029 B2 | 7/2009 | VanHarlingen et al. | |
| 7,613,927 B2 | 11/2009 | Holovacs | |
| 7,635,272 B2 | 12/2009 | Poppe | |
| 7,675,867 B1 | 3/2010 | Mraz et al. | |
| 7,677,065 B1 | 3/2010 | Miao | |
| 7,746,321 B2 | 6/2010 | Banning | |
| 7,759,930 B2 | 7/2010 | Colli | |
| 7,774,774 B1 | 8/2010 | Mulligan | |
| 7,853,740 B2 | 12/2010 | Liaw et al. | |
| 7,873,498 B2 | 1/2011 | Chien et al. | |
| 7,945,792 B2 | 5/2011 | Cherpantier | |
| 8,090,961 B2 | 1/2012 | Yoffe et al. | |
| 8,769,172 B2 | 7/2014 | Soffer et al. | |
| 8,943,373 B1 | 1/2015 | Angaluri et al. | |
| 9,336,161 B2 | 5/2016 | del Toro | |
| 10,585,731 B2 | 3/2020 | Soffer | |
| 10,992,246 B2* | 4/2021 | Nishijima | H02P 25/22 |
| 2002/0091850 A1 | 7/2002 | Perholtz | |
| 2002/0120786 A1 | 8/2002 | Sehayek et al. | |
| 2002/0166067 A1 | 11/2002 | Pritchard et al. | |
| 2003/0035049 A1 | 2/2003 | Dickens et al. | |
| 2003/0217123 A1 | 11/2003 | Anderson et al. | |
| 2004/0107358 A1 | 6/2004 | Shiakallis | |
| 2004/0177264 A1 | 9/2004 | Anson et al. | |
| 2004/0201765 A1 | 10/2004 | Gammenthaler | |
| 2005/0015980 A1 | 1/2005 | Kottilingam et al. | |
| 2005/0022061 A1 | 1/2005 | Ozasa | |
| 2005/0044266 A1 | 2/2005 | O'Neil | |
| 2005/0246433 A1 | 3/2005 | Carrigan | |
| 2005/0073446 A1 | 4/2005 | Lazaridis | |
| 2005/0138433 A1 | 6/2005 | Linetsky | |
| 2005/0216620 A1 | 9/2005 | Sandulescu | |
| 2006/0031447 A1 | 2/2006 | Holt | |
| 2006/0123182 A1 | 6/2006 | Sandulescu et al. | |
| 2006/0143571 A1 | 6/2006 | Chan | |
| 2006/0146491 A1 | 7/2006 | Chen | |
| 2006/0230110 A1 | 10/2006 | VanHarlingen et al. | |
| 2006/0267936 A1 | 11/2006 | Hoerl et al. | |
| 2006/0280068 A1 | 12/2006 | Weirauch et al. | |
| 2007/0033289 A1 | 2/2007 | Nuyttens et al. | |
| 2007/0070042 A1 | 3/2007 | Lin et al. | |
| 2007/0130573 A1 | 6/2007 | Farquhar | |
| 2007/0174381 A1 | 7/2007 | Kitamura | |
| 2007/0200858 A1 | 8/2007 | Hsieh et al. | |
| 2007/0245165 A1 | 10/2007 | Fung | |
| 2007/0260785 A1 | 11/2007 | Chen | |
| 2007/0283450 A1 | 12/2007 | Anson et al. | |
| 2008/0015067 A1 | 1/2008 | Negrin | |
| 2008/0036741 A1 | 2/2008 | Hsieh et al. | |
| 2008/0048975 A1 | 2/2008 | Lei Bow | |
| 2008/0052442 A1 | 2/2008 | Matthews | |
| 2008/0062121 A1 | 3/2008 | Huang et al. | |
| 2008/0062632 A1 | 3/2008 | Liu | |
| 2008/0081515 A1 | 4/2008 | VanHarlingen et al. | |
| 2008/0098307 A1 | 4/2008 | Corbefin et al. | |
| 2008/0102708 A1 | 5/2008 | Wu | |
| 2008/0129692 A1* | 6/2008 | Sween | G06F 3/0227 345/157 |
| 2008/0148339 A1 | 6/2008 | Hill | |
| 2008/0163000 A1 | 7/2008 | McKim et al. | |
| 2008/0178282 A1 | 7/2008 | Yoffe et al. | |
| 2008/0198128 A1 | 8/2008 | Tsai et al. | |
| 2008/0263232 A1 | 10/2008 | Guillot et al. | |
| 2008/0288677 A1 | 11/2008 | Kirshtein | |
| 2008/0309584 A1 | 12/2008 | Zhang | |
| 2009/0013111 A1 | 1/2009 | Berland et al. | |
| 2009/0033668 A1 | 2/2009 | Pederson et al. | |
| 2009/0064273 A1 | 3/2009 | Buer | |
| 2009/0106563 A1 | 3/2009 | Cherpantier | |
| 2009/0150580 A1 | 6/2009 | Wen | |
| 2009/0150664 A1 | 6/2009 | Zhang et al. | |
| 2009/0204742 A1 | 8/2009 | Wiler | |
| 2009/0212844 A1 | 8/2009 | Darmawan et al. | |
| 2009/0222670 A1 | 9/2009 | Mehta et al. | |
| 2009/0293136 A1 | 11/2009 | Campbell et al. | |
| 2009/0296723 A1 | 12/2009 | Chang | |
| 2010/0023744 A1 | 1/2010 | Markel | |
| 2010/0083122 A1 | 4/2010 | Kozloski et al. | |
| 2010/0100652 A1 | 4/2010 | Lin et al. | |
| 2010/0110004 A1 | 5/2010 | Minutillo et al. | |
| 2010/0211709 A1 | 8/2010 | Chen | |
| 2010/0281410 A1* | 11/2010 | Heintze | G06F 3/0219 715/769 |
| 2010/0295859 A1 | 11/2010 | Stauffer et al. | |
| 2010/0302169 A1 | 12/2010 | Pance | |
| 2011/0080342 A1 | 4/2011 | Haren | |
| 2011/0145451 A1 | 8/2011 | Soffer | |
| 2011/0200121 A1 | 8/2011 | Costa | |
| 2011/0208963 A1 | 8/2011 | Soffer | |
| 2011/0252153 A1 | 10/2011 | Vlodavsky et al. | |
| 2012/0042099 A1 | 2/2012 | Wong et al. | |
| 2012/0154375 A1 | 6/2012 | Zhang | |
| 2012/0159651 A1 | 6/2012 | Beachem | |
| 2013/0050084 A1 | 2/2013 | Soffer | |
| 2013/0054848 A1 | 2/2013 | Huang | |
| 2013/0067534 A1 | 3/2013 | Soffer | |
| 2014/0015673 A1 | 1/2014 | Soffer | |
| 2014/0019648 A1 | 1/2014 | Huang | |
| 2014/0019652 A1 | 1/2014 | Soffer | |
| 2014/0043750 A1 | 2/2014 | Calderone | |
| 2014/0053256 A1 | 2/2014 | Soffer | |
| 2014/0059257 A1* | 2/2014 | del Toro | G06F 3/1454 710/72 |
| 2014/0098485 A1 | 4/2014 | Vahid | |
| 2014/0172422 A1 | 6/2014 | Hefetz | |
| 2014/0289433 A1 | 9/2014 | Soffer | |
| 2014/0344494 A1 | 11/2014 | Zeung | |
| 2015/0020169 A1 | 1/2015 | Soffer | |
| 2015/0261598 A1 | 9/2015 | Balasubramanian | |
| 2015/0365237 A1 | 12/2015 | Soffer | |
| 2015/0378851 A1 | 12/2015 | Kobayasi | |
| 2016/0077842 A1 | 3/2016 | Turnock | |
| 2016/0203343 A1 | 7/2016 | Soffer | |
| 2016/0227149 A1 | 8/2016 | Dickens | |
| 2016/0371149 A1 | 12/2016 | Jinto | |
| 2017/0256143 A1 | 9/2017 | Montero | |
| 2020/0125771 A1 | 4/2020 | Soffer | |

FOREIGN PATENT DOCUMENTS

| | | |
|---|---|---|
| CN | 103049343 | 4/2017 |
| EP | 1183614 | 8/2006 |

(56) References Cited

FOREIGN PATENT DOCUMENTS

| | | |
|---|---|---|
| EP | 2499595 | 9/2009 |
| GB | 2484736 | 4/2012 |
| KR | 20180053502 | 5/2018 |
| WO | 2003/009118 | 1/2003 |
| WO | 2004/107181 | 12/2004 |
| WO | 2006/062951 | 6/2006 |
| WO | 2006/090091 | 8/2006 |
| WO | 2009/018493 | 2/2009 |
| WO | 2010/200991 | 2/2010 |
| WO | 2013/3035098 | 3/2014 |
| WO | 2015/1189841 | 12/2015 |
| WO | 2018/154569 | 8/2018 |

OTHER PUBLICATIONS

"Belkin Universal 2nd Gen Secure KVM Switch Datasheet"; Belkin International, Inc., 2021. (Year: 2021).*

Belkin F1DN008KBD FAQs; Belkin International, Inc. webpage URL <https://www.belkin.com/US/support-article?articleNum=318275> accessed Jan. 10, 2022, dated Nov. 19, 2014. (Year: 2014).*

Belkin KVM Remote Control with Integrated Keyboard; Belkin International, Inc. product webpage URL <https://www.belkin.com/us/business/cybersecurity-secure-kvm/secure-accessories/belkin-kvm-remote-control-with-integrated-keyboard/p/p-f1dn008kbd/> accessed Jan. 10, 2022, dated Dec. 19, 2020. (Year: 2020).*

\* cited by examiner

SYSTEM AND METHOD OF POLYCHROMATIC IDENTIFICATION FOR A KVM SWITCH

CROSS-REFERENCE TO RELATED APPLICATIONS

This application is a continuation-in-part of U.S. patent application Ser. No. 16/926,795 filed on 13 Jul. 2020.

FIELD OF THE INVENTION

The present invention generally relates to keyboard, video, mouse (KVM) switching systems. More particularly, the present invention relates to systems and methods for indication of a selected/active host by a KVM switch.

BACKGROUND OF THE INVENTION

A KVM switch is a device that typically enables a single user to operate multiple computers (hosts) from a single set of peripheral devices. In some cases, where some of the hosts are more data sensitive than others, it may be recommended to prevent data leakage between host computers connected to KVM switches and between one or more networks connected to the host computers. KVM switches that can maintain separation and/or isolation of data between host computers and/or data flowing through various elements of the KVM switch are usually called secured KVM switches.

One of the weakest links regarding security in KVM switches, in general, and in secure KVM switches, particularly, may be the user awareness of the host that the user is working on. It is important that the user is aware of the type of host the user is working on (e.g., which host is active), to, for example, avoid mistakenly working on an erroneous wrong host. For example, a KVM switch can be connected to three host computer, host A, host B, and host C. The user of the KVM switch may operate the computer as if it is working on host A, when in reality the KVM switch is connected such that host B is active. In this manner, errors can occur.

SUMMARY OF THE INVENTION

In some embodiments, the present invention provides a way to increase the user awareness to the host the user is currently working on, by assigning a color to the hosts and providing polychromatic indication to the active host that is attached to the user's set of peripherals.

There is thus provided, in accordance with some embodiments of the invention, a peripheral devices switching system configured to be coupled to a plurality of host computers, the system including: at least one set of peripheral devices, a peripheral devices switch that is configured to be coupled to said at least one set of peripheral devices and said plurality of host computers, where the peripheral devices switch assigns a color to each host computer of the plurality of host computers, and where the peripheral devices switch is configured to couple between said at least one set of peripheral devices and an active host computer of the plurality of host computers, and one or more polychromatic light sources that are being included in the peripheral devices switch, the at least one of the peripheral devices of the sets of peripheral devices or both. In some embodiments, the peripheral devices switch indicates the active host computer by illuminating at least one of the polychromatic light sources by the color that is assigned to the active host computer.

In some embodiments, the peripheral devices switch includes a remote control and the remote control indicates the active host computer by illuminating with one or more polychromatic light source the color that is assigned to the active host computer. In some embodiments, the set of peripheral devices includes a keyboard that includes one or more polychromatic light source located under or adjacent to one or more keys of said keyboard. In some embodiments, the set of peripheral devices includes a pointing device that includes one or more polychromatic light source.

In some embodiments, the set of peripheral devices includes a microphone and includes one or more polychromatic light source and when the microphone is open to the active host, the one or more polychromatic light source illuminate in the color assigned to the active host computer that receive the voice signal from said microphone. In some embodiments, the one or more polychromatic light source includes Red-Green-Blue (RGB) LEDs. In some embodiments, the one or more polychromatic light source includes two or more monochromatic light sources. In some embodiments, the peripheral devices switch is a secured peripheral devices switch.

There is thus provided, in accordance with some embodiments of the invention, a keyboard configured to be coupled with a KVM switch, the keyboard including: a plurality of standard keyboard keys, where the keys are associated with one or more polychromatic light sources, a controller, and an interface configured to enable communication between the controller and the KVM switch. In some embodiments, the keyboard controller is configured to receive instructions from the KVM switch, and condition upon said instructions the controller controls the one or more polychromatic light sources to illuminate the plurality of standard keyboard keys with the color assigned to an active host.

In some embodiments, the keyboard further includes a plurality of KVM control keys, where the keys include one or more polychromatic light source, each KVM control key is configured to select an active host by the KVM switch, the controller scans the plurality of KVM control keys and upon pressing any KVM control keys sends a message to the KVM switch through the interface, the KVM switch instructs the controller to illuminate the keyboard with a color assigned to the active host, and conditioned upon a KVM switch instruction the controller controls the one or more polychromatic light sources to illuminate the corresponding KVM control key with the color assigned to the active host. In some embodiments, the interface is one of (a) Serial; (b) PS/2; and (c) USB interface. In some embodiments, the illumination of the keys is performed using RGB LEDs. In some embodiments, the controller receives messages through the interface from the KVM switch on event of switching active host, said message includes color information. In some embodiments, the plurality of standard keyboard keys includes any one of or any combination of (a) Latin letters (a-z) keys, (b) digit keys, (c) punctuation keys, (d) symbol keys, (e) control keys, (f) function keys, (g) navigation keys, (h) numeric keypad keys, and (i) any non-Latin letter keys. In some embodiments, the plurality of standard keyboard keys complies with ISO/IEC 9995 keyboard standard series.

There is thus provided, in accordance with some embodiments of the invention, a method of indicating active host computer while working with a peripheral devices switch, the method including: (a) assigning, by the peripheral devices switch a color for each host computer, (b) receiving, by a computing device a switching command that indicates a particular host computer of a plurality of host computers to be coupled to the peripheral devices switch, (c) coupling, by the peripheral devices switch, the active host computer to at least one set of peripheral devices, and (d) illuminating one or more polychromatic light sources to indicate the active host computer, where the illumination is with the color assigned to the active host computer.

In some embodiments, the peripheral devices switch further includes a remote control with polychromatic light sources, and where step (c) is performed by the polychromatic light sources of the remote control. In some embodiments, the set of peripheral devices includes a keyboard with polychromatic light sources, and where step (c) is performed by the polychromatic light sources of the keyboard. In some embodiments, in step (b) a selected peripheral device is coupled to a selected host computer which is different from the host computer coupled to the other peripheral devices, and where in step (c) said selected peripheral device is indicated by illuminating the selected peripheral device using the assigned color for the selected host. In some embodiments, the polychromatic light sources are RGB LEDs. In some embodiments, the peripheral devices switch is secured peripheral devices switch.

There is thus provided, in accordance with some embodiments of the invention, a keyboard configured to be coupled with a KVM switch, the keyboard comprising:
  a plurality of standard keyboard keys;
  a plurality of illumination elements;
  a standard keyboard device controller;
  a KVM switch keyboard device controller; and
  a composite interface configured to enable communication between the keyboard device controller and the KVM switch, and between the KVM switch keyboard device controller and the KVM switch,
wherein the standard keyboard device controller is configured to send to the KVM switch events of keypresses on the plurality of standard keyboard keys, the KVM switch keyboard device controller is configured to receive instructions from the KVM switch, and condition upon said instructions the KVM switch keyboard device controller activates the plurality of illumination elements.

In some embodiments, at least one of the illumination elements of the plurality of illumination elements is polychromatic elements.

In some embodiments, one or more of the polychromatic elements are configured to indicate an active host computer by a color assigned with the active host computer.

In some embodiments, the KVM switch keyboard device controller receives messages or commands through the composite interface from the KVM switch on event of switching active host, said messages or commands comprise color information.

In some embodiments, some of the plurality of illumination elements are located under or adjacent to one or more keys of said keyboard are associated with these keys.

In some embodiments, the one or more polychromatic illumination elements comprises Red-Green-Blue (RGB) LEDs.

In some embodiments, the plurality of standard keyboard keys comprises any one of or any combination of (a) Latin letters (a-z) keys, (b) digit keys, (c) punctuation keys, (d) symbol keys, (e) control keys, (f) function keys, (g) navigation keys, (h) numeric keypad keys, and (i) any non-Latin letter keys.

In some embodiments, said plurality of standard keyboard keys complies with ISO/IEC 9995 keyboard standard series.

In some embodiments, the keyboard further comprises one or more KVM control keys, wherein the KVM switch keyboard device controller is configured to send to the KVM switch events of keypresses on the one or more KVM control keys.

In some embodiments, the one or more KVM control keys are configured to select an active host by the KVM switch.

In some embodiments, the keyboard further comprises lock keys and lock indicators and wherein the standard keyboard device controller is configured to send to the KVM switch events of keypresses on the lock keys, and the KVM switch keyboard device controller is configured to receive lock keys status commands from the KVM switch, and condition upon said lock keys status commands the KVM switch keyboard device controller activates the lock indicators.

In some embodiments, the composite interface is a single interface protocol capable to aggraded a plurality of devices.

In some embodiments, the composite interface is USB.

In some embodiments, the composite interface comprises two independent interface protocols either by sharing a single connector and cable but having separate pins in the connectors and corresponding wires in the cable or by having a separate cable and separate connector to each one of said interface protocol.

In some embodiments, the composite interface that enable communication between the KVM switch keyboard device controller and the KVM switch comprises three wires that carry the lock keys status commands wherein first wire signals the Caps Lock state, second wire signals the Num Lock state and third wire signals the Scroll Lock state.

In some embodiments, the composite interface comprises a circuitry to detect when the keyboard is connected to a KVM switch supporting composite interface or directly to host computer that support communication only with the standard keyboard device controller, and condition upon detecting said direct keyboard to host connection a keyboard composite controller disable the KVM switch keyboard device controller and couple at least the plurality of illumination elements to the standard keyboard device controller.

In some embodiments, the keyboard further comprises a keyboard composite controller that couples the plurality of keys and the plurality of indicators either to the standard keyboard device controller, or to the KVM switch keyboard device controller.

There is thus provided, in accordance with some embodiments of the invention, a peripheral devices switch, configured to couple between a plurality of host computers and one or more peripheral devices wherein at least one peripheral device comprises one or more polychromatic light sources, the peripheral devices switch comprises:
  a plurality of host interfaces configured to be connected to the hosts;
  one or more peripheral device interfaces to be connected to the one or more peripheral device;
  a switching circuitry; and
  a controller,
wherein
  the controller is configured to receive a color assigned to each of the plurality of host computers,
  the controller is configured to receive a switching command that indicates a particular host computer of the plurality of host computers to be coupled to the at least one peripheral device, wherein the particular host computer is the active host computer, condition upon the switching command the controller instructs the switching circuitry to couple the host interfaces that are connected to the selected active host computer to the peripheral device interfaces, and condition upon the switching command the controller instructs to at least one peripheral device, through the one or more peripheral device interfaces, to illuminate the one or more polychromatic light sources in order to indicate the active host computer, wherein the illumination is with the color assigned to the active host computer.

In some embodiments, at least one of the peripheral device interfaces is composite interface with a primary standard peripheral device interface for the standard peripheral device functionalities, and secondary dedicated peripheral device interface configured to instructs the illumination of the polychromatic indication.

In some embodiments, at least one of the peripheral device interfaces is USB.

In some embodiments, the USB interface is composite device interface over the USB, and wherein the primary standard peripheral device interface is a USB standard peripheral device over the USB and the secondary dedicated peripheral device interface is a secondary USB device over the same USB that is used to instructs the illumination of the polychromatic indication.

In some embodiments, the composite interface comprises two independent interface protocols either by sharing a single connector and cable but having separate pins in the connector and corresponding wires in the cable, or by having a separate cable and separate connector to each one of said interface protocol.

In some embodiments, peripheral devices switch is a KVM switch (Keyboard, Video, and Mouse switch).

In some embodiments, at least one of the peripheral device interfaces is a keyboard.

In some embodiments, the keyboard's peripheral device interface is a composite interface with a primary standard peripheral device interface for the keyboard functionalities, and secondary dedicated peripheral device interface configured to instructs the illumination of the polychromatic indication.

In some embodiments, the secondary dedicated peripheral device interface comprises three wires that carry the keyboard lock keys status commands.

There is thus provided, in accordance with some embodiments of the invention, a peripheral device configured to be connected to a peripheral device switch that is coupled to plurality of host computers, the peripheral device comprises:
a peripheral device interface;
one or more polychromatic light sources; and
a controller,
wherein the controller configured to receive instructions from the peripheral device switch to illuminate the one or more polychromatic light sources in order to indicate one of the plurality host computers, wherein the illumination is with a color assigned to said one of the plurality host computers.

In some embodiments, the peripheral device is a microphone, a camera, a speakerphone, or headset.

In some embodiments, the peripheral device further comprises a push button to enable manual coupling of the peripheral device to the host computer and the peripheral device illuminate at least one of the one or more polychromatic light sources, with the color assigned with said one of the plurality host computers, condition upon said manual coupling is activated.

In some embodiments, the peripheral device is an external hard disk, a smart-card reader, a Common Access Card (CAC) reader, biometric reader, printer, scanner, or peripheral device with USB interface.

In some embodiments, the peripheral device is a multi-domain smart-card reader wherein the multi-domain smart-card reader may simultaneously authenticate a smart-card holder in front of two or more of the plurality host computers and for each authenticated host computer one or more polychromatic light sources are illuminated with the color assigned with the corresponding host computer.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DETAILED DESCRIPTION OF EMBODIMENTS OF THE INVENTION

Figure 1:
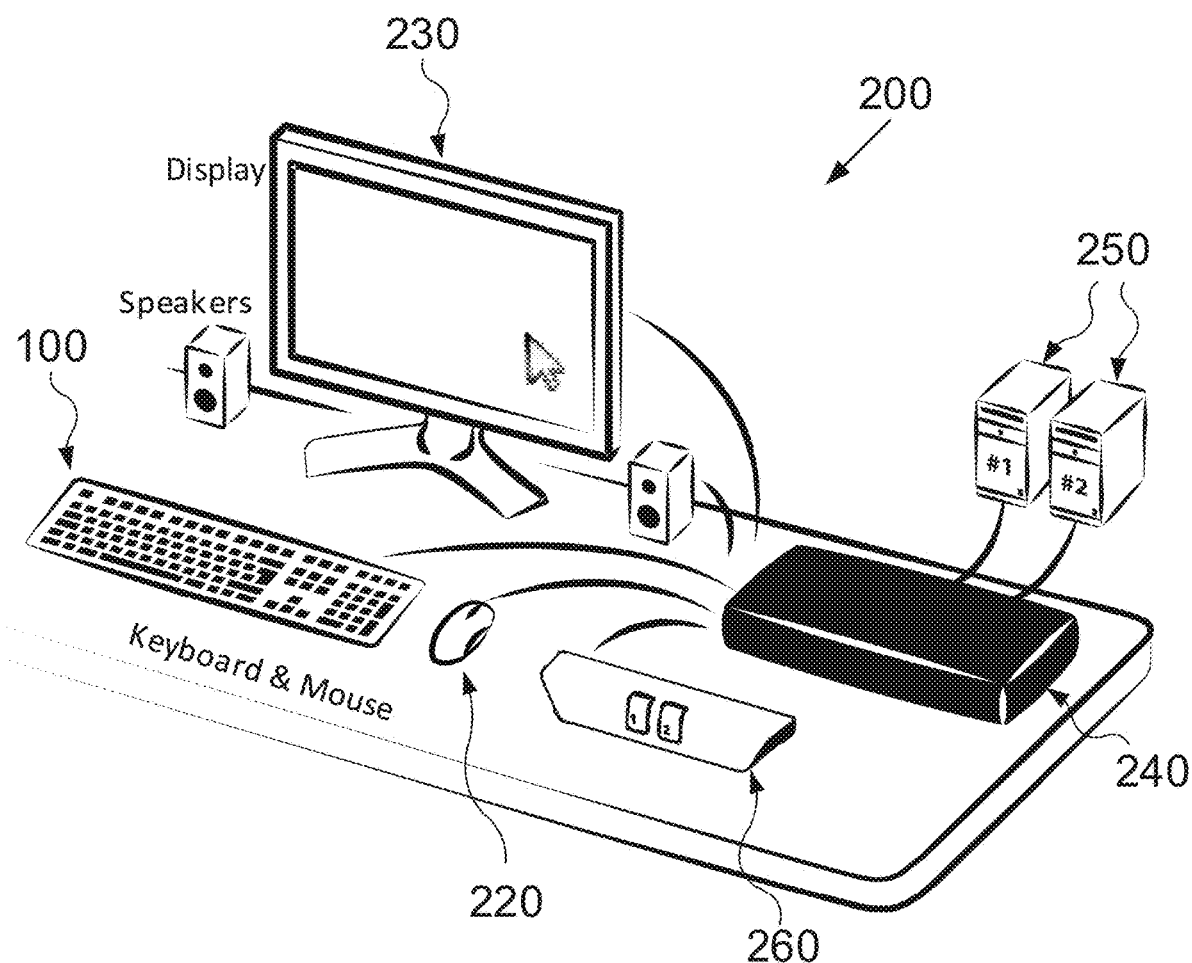
FIG. 1 is a schematic illustration of a typical configuration of a KVM switching system, in accordance with some embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention, in some embodiments thereof, relates to Keyboard, Video and Mouse (KVM) switching systems and, more particularly, but not exclusively, to indication of the selected/active host by a KVM switch. In some embodiments, a KVM switch is a device that enables a single user to operate multiple computers (e.g., hosts) from a single set of peripheral devices. In some embodiments, where at least some of the hosts are more data sensitive than others, it can be important to prevent data leakage between the host computers connected (e.g., directly connected via wired connections) to the KVM switch and between the networks coupled to the respective hosts. KVM switches that maintain data separation (e.g., data isolation) can be referred to as a secured KVM switch. One difficulty regarding security in KVM switches, in general, and in secure KVM switches, in specific, is the user's awareness of the particular host of a plurality of hosts the user is currently working with. It may be important that the user is aware of the active/selected host he works with. In some embodiments, the current invention addresses this issue.

In various embodiments, the KVM switch, the host computers, the peripheral devices and/or any components/devices of the system are connected electrically, mechanically or both. In various embodiments, the KVM switch, the host computers, the peripheral devices and/or any components/devices of the system are connected directly without any intermediary components or devices. In various embodiments, the KVM switch, the host computers, the peripheral devices and/or any components/devices of the system are connected via cables, connectors, wires, PCB traces, pins, switches and/or any other low ohmic resistance element that is used to establish galvanic connection between the components and/or devices.

In various embodiments, the KVM switch, the host computers, the peripheral devices and/or any components/devices of the system are connected through one or more passive or active intermediary components or devices.

In various embodiments, the KVM switch, the host computers, the peripheral devices and/or any components/devices of the system are arranged to cooperate with one another to provide a one or more desired functions.

According to some embodiments, a keyboard-video-mouse (KVM) switching system is provided to identify a selected or active host by a KVM switch. In some embodiments, the user switches between hosts by pressing keys that are located either on the KVM switch enclosure itself or, in the case where the KVM switch is not located close enough to the user, in a remote control of the KVM switch located near the user. The remote control can be referred to as Auxiliary Front Panel (AFP). Once the user switches to a particular host, that host can become an active host.

A host computer, on which the user desires to be the active host, may be selected by pressing on a key on the KVM switch or the KVM switch remote control. In a two hosts KVM switch system (e.g., a system that allows the user to be working on two computers with the same peripheral devices), two keys may be used by the user (e.g., two keys on the KVM switch or two keys on the KVM switch remote control) in order to switch between the two computers. Similarly, in a four hosts KVM switch system, four keys may be used by the user to switch between the four computers. In some embodiments, illumination indicators are associated with the keys, to, for example, drive the user's awareness to an active host. The indictors may be located in, on, in proximity to, or adjacent to one or more keys (e.g., the host selection keys). For example, assume there are three hosts and three keys on the KVM switch (or KVM switch with remote control), and host #3 is the active host, the illuminated indicator illuminates the corresponding push button key #3 or the corresponding indicator #3 is illuminated. In some embodiments, a remote control of the KVM switch having the indicators may be configured to be located on top of a computer display frame to, for example, provide an improved line of sight view between a user's eyes and an indication of the active host.

In some embodiments, the KVM switch enclosure or the remote-control enclosure may include one or two digits display that displays the host number, e.g., the digit '3' continuing with the above example, as the indicator. To ease the switching between hosts, some KVM switch may support selection of the active host using keypress combinations, also known as keys shortcuts, over the keyboard. For example, pressing 'Ctrl'+'Alt'+'1' keys on the keyboard may switch an active host to host #1, and pressing 'Ctrl'+ 'Alt'+'2' may switch active host to host #2.

For purposes of better understanding some embodiments of the present invention, as illustrated in FIGS. 1-7 of the drawings, reference is first made to FIG. 1.

FIG. 1 schematically illustrates a typical system configuration with a KVM switch. A system 200 includes a keyboard 100, a mouse 220, a display 230 (also known as a computer monitor), a KVM switch 240, a plurality of computer hosts 250, and in some embodiments a KVM remote control 260.

According to some embodiments, the system may further include speakers, headphone, microphone, printers and/or other peripheral devices such as external storage, card reader, such as smart card reader for authentication, etc. (not shown in FIG. 1). Hosts 250 of system 200 may be coupled to local area networks (LANs) or any other communication networks. The network coupled to each host may be of a different security level. For example, one network is an unclassified network that is connected to the Internet, while the other network is a classified network and is only internal in an organization or a campus.

The hosts 250 may be electrically and/or mechanically coupled to the LANs and/or any other communication networks. The hosts 250 may be directly connected or coupled to one or more of the LANs and/or one or more of any other communication networks without any other devices in between. In various embodiments, the connections are through cables, electrical connectors, wires, PCB traces, pins, switches, and/or any other low ohmic resistance element that is used to establish galvanic connection between elements.

According to some embodiments, the KVM switch 240 is configured to couple to keyboard 100 and/or mouse 220 and/or display 230, and allows the user to control multiple computers (or hosts) 250 from a single set of peripherals, such as, keyboard 100, video monitors 230, and mice 220. In some embodiments, the KVM switch 240 allows switching two or more video monitors 230 and/or three or more user interface devices (e.g., in USB standard as Human Interface Devices (HID)) as well as audio peripherals, such as, speaker and microphone, other USB devices, such as, ID card readers, and/or other devices as are known in the art to couple to and be switched by a KVM switch.

In order to switch between hosts 250, the user may press a dedicated push button located on the enclosure of KVM switch 240. Upon receiving and/or processing of the host switching command, the corresponding indicator in KVM switch 240 may be illuminated. The number of computers or hosts 250 that can be coupled to the KVM switch may be two, as illustrated in FIG. 1. In some embodiments the hosts themselves may reside in remote locations, such as, in data centers.

In some embodiments, KVM switch 240 may be located out of reach of the user. For example, the KVM switch 240 may be few meters away from the user's desk in the other side of the room or up-to many kilometers away in different premises. In such cases, a distance extender device, coupled between the user peripherals 100, 220, 230 and the KVM switch 240, may be used. The distance extender's media may include a USB cable, a category 5 cable that can carry Ethernet family protocols, an optical fiber or the like.

In some embodiments, a remote control can be used to switch between hosts. For example, when the user cannot reach, or cannot easily reach, the KVM switch 240 push button keys on the KVM switch enclosure, a remote control 260 may be used. To switch between hosts 250, the user may press a push button located on the enclosure of remote control 260. Upon receiving a switching command by remote control 260, remote control 260 sends the switching request command to KVM switch 240. After processing this command by KVM switch 240, KVM switch 240 may send back a switching acknowledge to KVM remote control 260 and then KVM remote control 260 illuminates the proper indicator.

In some embodiments, securing the KVM system from cyber-attacks is desired. The secure KVM may have several levels of security. One level includes a "whitelist" or authorized peripheral devices that are allowed to be coupled to KVM switch 240. Another level is to enforce only unidirectional communication to further isolate between the hosts so that no data (or substantially no data) can be leaked between the hosts. In some embodiments, data from the HID device may only flow to the host and for the video stream, data may only flow from the host to the display. In some embodiments, EDID reading or USB device enumerations may be used for bi-directional communication that is needed in the initialization setup. This bi-directional communication may be made secured by allowing it only in KVM power-up and using a host emulator and/or peripheral device emulators in order to communicate this data between the peripheral devices and the host whenever it is needed.

Figure 2:
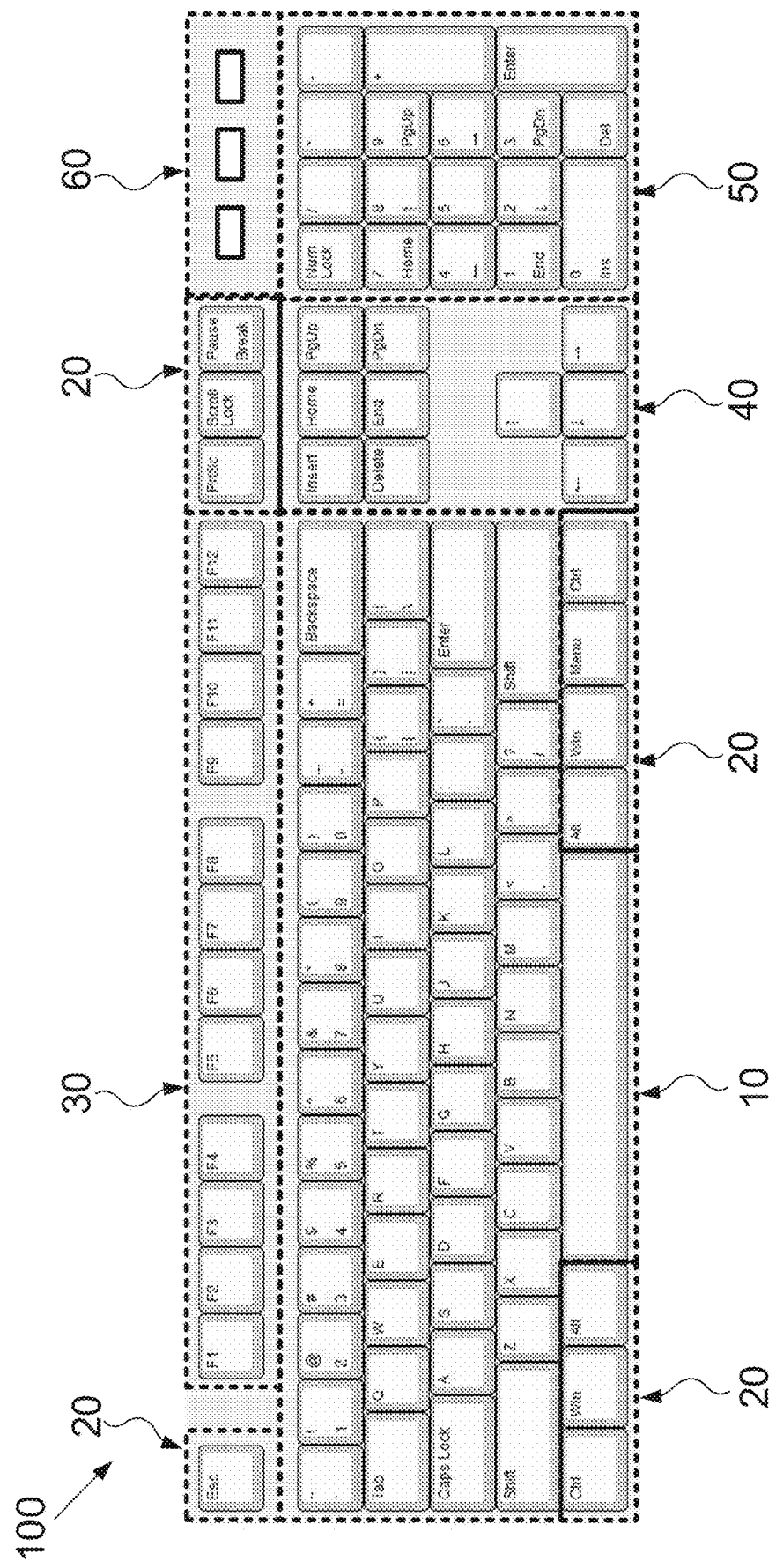
FIG. 2 is an illustration of a standard QWERTY keyboard used, in accordance with some embodiments of the present invention.

Reference is made now to FIG. 2. FIG. 2 illustrates a standard QWERTY keyboard 100 including alphanumeric keys 10, control keys 20, function keys 30, navigation keys 40, and numeric keypad 50. The keyboard 100 may also include three illuminated indicators 60 to indicate locked states that can be activated by the three lock keys: Caps Lock, Num Lock and Scroll Lock. The Caps Lock key is used for entering capital letters, the Num Lock key is used to switch between digits and the navigation keys in the numeric keypad, and Scroll Lock key originally used together with the arrow keys to either scroll the contents of a text window or to moving the cursor on the text window.

In some embodiments, the "KVM switch" includes a device that switches, e.g., couples, between a plurality of host computers and at least one set of peripheral devices. In various embodiments, the set of peripheral devices may include a single peripheral device (e.g., a mouse) or a plurality of peripheral devices provided as a set (e.g., a keyboard and a mouse). The set of peripheral devices may include of at least one of a keyboard (K) and a mouse (M). In various embodiments, the mouse is a track ball, touch pad or the like. In some embodiments, the set of peripheral devices may further include a video display (V). The video display, also referred as the computer monitor, may be any device presenting visual information to the user, including, but not limited to, cathode-ray tube CRT display, Plasma Display, Liquid Crystal Display (LCD), Light-Emitting Diode (LED) display and the like. The computer monitor may come in apparatus form-factor of computer monitor, TV set, head-mounted display, video projector and the like.

In some embodiments, the set of peripheral devices includes a plurality, e.g., two or four, computer monitors. The set of peripheral devices may further include at least one of, or any combination of, audio devices such as speaker or headset to enable hearing voices or sounds transmitted from the host computer, a microphone to enable transmission of voice from the user to the host computer, an IP telephone handset to perform telephone calls through the host computer network, a video camera to perform video tele-conferencing, a user authentication device, such as, fingerprint reader, biometric reader, token generator reader, Common Access Card (CAC) reader, Personal Identity Verification (PIV) card reader, smartcard reader and the like. The set of peripheral devices may further include other personal use peripheral devices such as personal printers, personal scanners, personal USB devices and the like.

In some embodiments, peripheral devices switch is the switch positioned between the one or more peripheral devices and the plurality of hosts, for instance as an alternative to the KVM switch. In some embodiments, the peripheral devices switch switches between peripheral devices such as Keyboard, Video monitor and Mouse peripheral devices as well as all other devices mentioned above, such as microphone, smartcard readers and the like. In some embodiments, the peripheral devices switch includes a KVM switch as well as a KM (Keyboard and Mouse only) switch, a KVM (video) combiner, a USB devices switch, an audio devices switch, or any similar device that switches. In some embodiments, the peripheral devices switch is coupled to a set of one or more peripherals and a plurality of hosts. In some embodiments, the peripheral devices switch is coupled between a set of one or more peripherals and a plurality of hosts. In some embodiments, the peripheral devices switch includes both a KVM switch and a KVM matrix, or peripheral devices matrix, which means a device that may switch, coupled between multiple sets of peripheral devices and multiple host computers in a way that a plurality of users may work simultaneously with a plurality of host computers wherein no two users are simultaneously operating with the same host computer.

According to some embodiments, additional feedback is provided by the system to indicate the active host, e.g., the current host the user is working with, and the current host the KVM switch is coupled to the set of the peripheral devices operated by the user. In some embodiments, in order to provide additional feedback each of the different hosts coupled to the KVM switch is coded with a distinct color, and providing this color indication, by light illumination by indicators in at least one of or the combination of (a) the KVM switch enclosure and/or the KVM remote control enclosure; and (b) at least one of or any combination of the peripheral devices in the peripheral device set, operated by the user.

Figure 3:
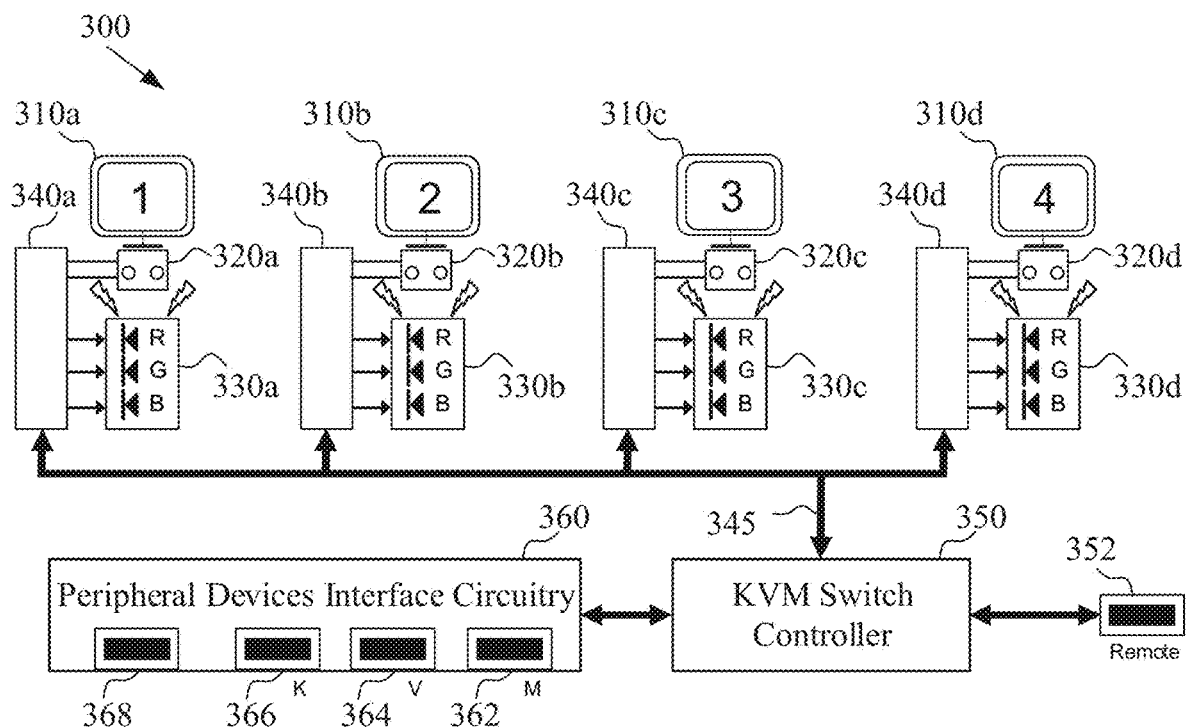
FIG. 3 is a schematic block diagram that shows a portion of a KVM switch in accordance with some embodiments of the invention.

Reference is made now to FIG. 3. FIG. 3 is a schematic block diagram that shows a portion of a KVM switch 300 in accordance with an embodiment of the invention. The KVM switch 300 includes keys 310*a*, 310*b*, 310*c* and 310*d* (e.g., push-buttons) that select the active host when pressed (e.g., key 310*b* corresponds to host #2). These keys may be located in the front panel of KVM switch 300 enclosure. Each key is mechanically coupled to a switch 320*a*, 320*b*, 320*c* and 320*d*. Switches 320*a*, 320*b*, 320*c* and 320*d* are coupled respectively to key interfaces 340*a*, 340*b*, 340*c* and 340*d*. Key interfaces 340*a*, 340*b*, 340*c* and 340*d* are coupled to a KVM switch controller 350 through connection 345. When a key 310*a*, 310*b*, 310*c* or 310*d* is pressed, KVM switch controller 350 may receive this event and change the active host accordingly. For the sake of clarity, all KVM switch 400 circuitries of the switch itself and all the circuitries between the set of peripheral devices interface and the host computer interface are not shown in FIG. 3.

Each one of the key interfaces 340*a*, 340*b*, 340*c* and 340*d* is coupled to a polychromatic light source 330*a*, 330*b*, 330*c* and 330*d* respectively. In some embodiments of the invention, the polychromatic light source includes one or more RGB LEDs that include illumination from Red LED, Green LED and Blue LED. Additionally, the polychromatic light source may include two or more monochromatic light sources. Upon changing the active host computer, KVM switch controller 350 may control, using key interfaces 340*a*, 340*b*, 340*c* and 340*d*, the polychromatic light sources 330*a*, 330*b*, 330*c* and 330*d*.

Herein and hereinafter, the suffix 'x' in 330*x* or 340*x* or any other reference signs may mean each, any or all similar elements, hence 340*x*, in this case, means any of 340*a*, 340*b*, 340*c* and 340*d*.

The key corresponding to the active host computer may be illuminated with the color assigned (or associated) to this host computer, while all other keys illumination is turned off. Additionally or alternatively, KVM switch controller 350 may send a command to a remote control via interface 352 to set an indication of the current active host in the remote control. Additionally or alternatively, KVM switch controller 350 may send a command to set a polychromatic indication of the active host to any one of or any combination of the set of peripheral devices via peripheral devices interface circuitry 360. Peripheral devices interface circuitry 360 includes an interface to keyboard 366, in some embodiments, one or more interfaces to a video display 364, interface to a mouse or a pointing device 362, and in some embodiments one or more interfaces to additional peripheral devices such as CAC card reader, microphone, etc.

In some embodiments of the invention, the selection of the active host computer may be initiated by external trigger and not by pressing keys 310*a*, 310*b*, 310*c* and 310*d* of KVM switch 300. For example, as presented in detail hereinafter, the command for selecting different host computer may be initiated by the remote control or one of the devices in the set of peripheral devices. In such case, KVM switch controller 350 may update its own indications by proper illuminating commands to any indication in polychromatic light source 330*a*, 330*b*, 330*c* and 330*d* and by sending the proper commands, if necessary, to the remote control and the peripheral devices.

Figure 4:
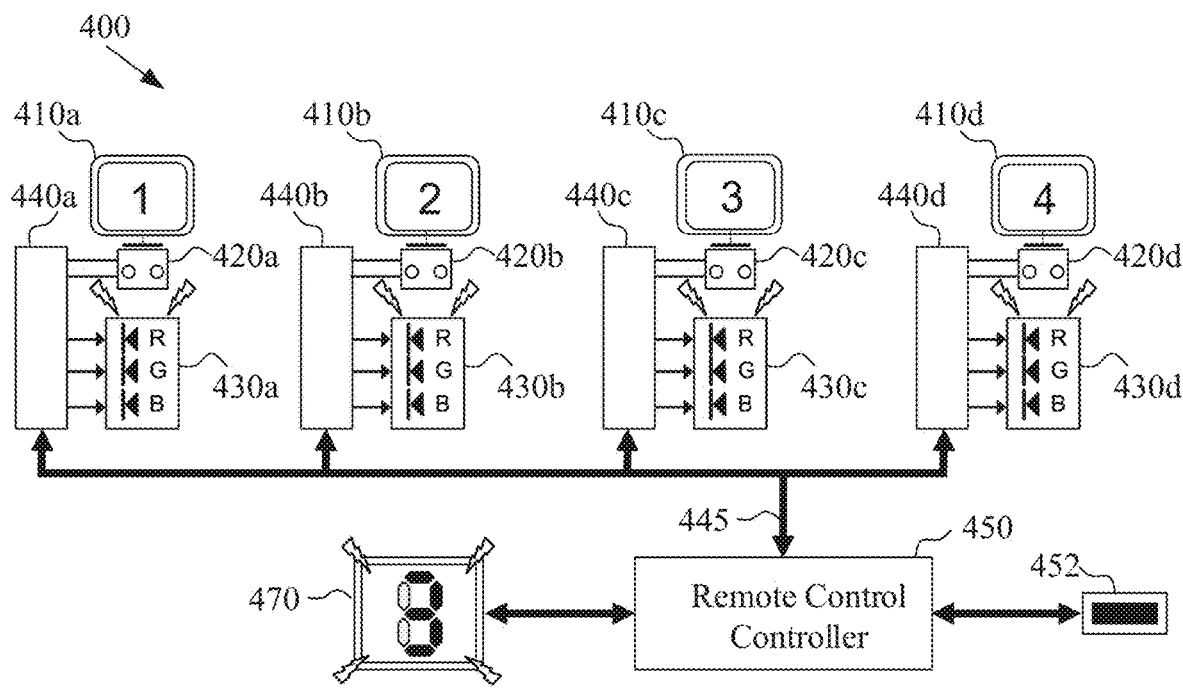
FIG. 4 is a schematic block diagram of a remote control of the KVM switch in accordance with some embodiments of the invention.

Reference is now made to FIG. 4. FIG. 4 is schematic block diagram of a remote control 400 of KVM switch 300 in accordance with an embodiment of the invention. In some embodiments, the host selection keys and the active host indication have similar elements to the one presented in KVM switch 300 (shown in FIG. 3).

The KVM block diagram of a switch remote control 400 includes four keys 410*a*, 410*b*, 410*c* and 410*d*; four switches 420*a*, 420*b*, 420*c* and 420*d*; four polychromatic light source 430*a*, 430*b*, 430*c* and 430*d*; and four key interfaces 440*a*, 440*b*, 440*c* and 440*d*. The key interfaces 440*a*, 440*b*, 440*c* and 440*d* are coupled to a remote-control controller 450 via connection 445.

In some embodiments of the invention, the number of supported hosts by the KVM switch may be in the range of 2-8. In some embodiments, the number of supported hosts may be any other natural number, n, and the numbers of keys 410*x* as well as elements 420*x*, 430*x*, 440*x* may be respectively 'n' too.

Suppose the present active host is host #2, then remote-control controller 450 may command the polychromatic light source 430*b* to illuminate with the color associated with host computer #2. Polychromatic light sources 430*a*, 430*c* and 430*d* may be controlled by remote-control controller 450 to off-state, e.g., no illumination. When the user presses key 430*c*, remote-control controller 450 receives this event and sends this event via interface 452 to KVM switch 300. Interface 452 is coupled by a cable to interface 352. Additionally or alternatively, the KVM remote control and KVM switch may be coupled via wireless connection.

The request to switch from host #2 to host number #3 may be processed in KVM switch 300 and as a result it produce back to remote control 400 command to turn-off the indication of host #2 and command to turn-on the indication of host #3 by illuminating key 410c (by polychromatic light sources 430c) with the color associated with host #3.

Additionally or alternatively, remote control 400 includes an active host indicator 470. Active host indicator 470 may include a digit display and background display. The background display may be illuminated with the color assigned to the active host and the digit display displays the digit corresponding to the channel number so with regards to the above example, before the host switch the digit display was displaying the digit '2', and after the host switch, the digit display displays the digit '3'. The color of the digit is either black (e.g., illumination off) or illuminated with a color that creates a good contrast to the color assigned to the active host (e.g., to attract the awareness of the user).

In some embodiments of the invention, the background display and digit display may be a 2D pixel array display wherein the digit and the background are created by manipulating the pixels of the image displayed by the 2D pixel matrix. Additionally or alternatively, digit display may be a seven-segment display and background display is a flat surface illuminates by one or more polychromatic light sources. Active host indicator 470 may be controlled by remote-control controller 450 in according to the command received from KVM switch 300.

Figure 5A:
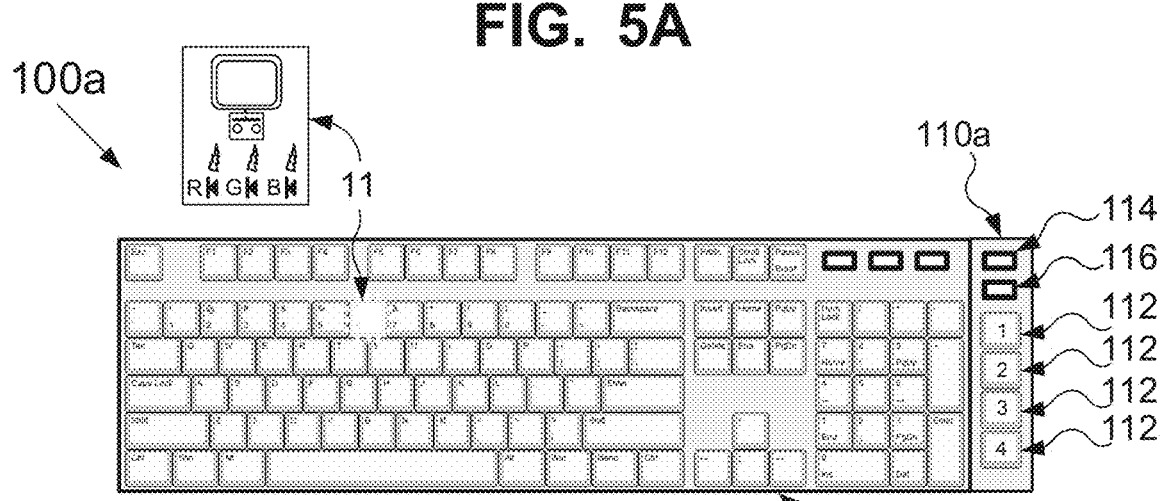
FIGS. 5A-5C are illustrations of several variants of keyboards that support a KVM switch, in accordance with some embodiments of the invention.
Figure 5B:
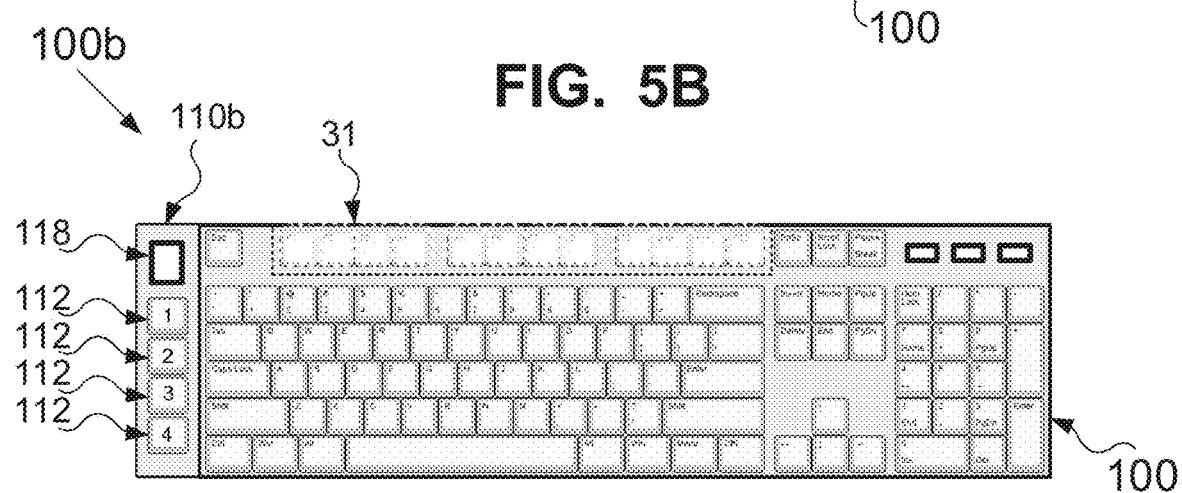
Figure 5C:
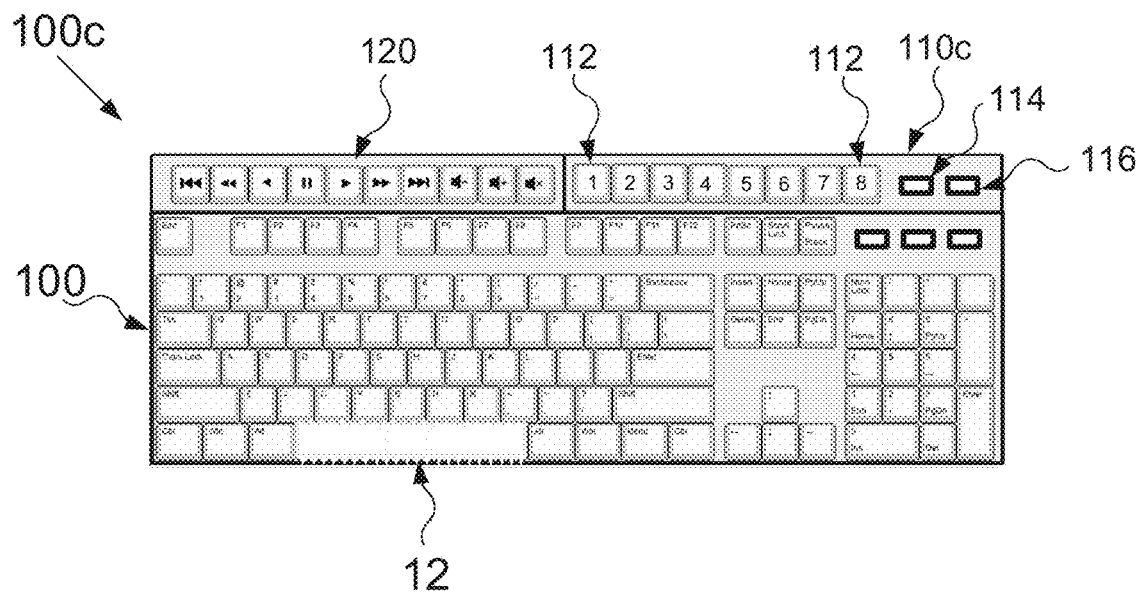

Reference is made now to FIGS. 5A-5C. FIGS. 5A-5C illustrate several variants of keyboards that support a KVM-switch. FIG. 5A illustrates a keyboard 100a including standard keyboard arrangement 100 and additional keyboard section 110a to support a KVM switch. Keyboard section 110a, in some embodiments of the invention, includes four keys 112 that to select active host similar to keys 310x of keyboard switch or KVM switch 300 and keys 410x of remote control 400. The four keys 112 may be labeled by the digits '1'-'4'. In addition, keyboard section 110a may include two indicators 114 and 116, e.g., LED light sources, that are used to reflect statuses from the KVM switch. The statuses may be the state of the KVM switch such as power on, initial setup in process, error indication, etc. In some embodiments of the invention, the position of keyboard section 110a is in the right side of keyboard 100.

In some embodiments of the invention, each one of keys 11 of keyboard 100a is a polychromatic illuminated key. For the sake of clarity in the figure, only the digit '6' key is illustrated as illuminated key. The internal structure of each illuminated key is illustrated in the figure inside a box above the keyboard near key 11.

Each key may include a plastic cap, coupled to a key switch, and besides or below the key switch, there is polychromatic light source. In some embodiments, the polychromatic light source may include three LEDs, each with a different color: R-RED LED, G-Green LED and B-Blue LED. This LEDs constellation also known as RGB LED. Standard 8 bit per color RGB control may provide over 16 million possible colors. Additionally or alternatively, other polychromatic light source, such as, a white light sources coupled to RGB filters or the like may be used.

KVM control keys 112 may be illuminated by polychromatic light sources as well. When a key 112 is pressed, the press event may be sent by the standard keyboard interface or alternatively by a dedicated interface between keyboard section 110a and the KVM switch to the KVM switch. When an acknowledge is received (the KVM can be switched to the host associated with this key and this host can become the active host), the key 112 illuminates in a preset color that is associated with the current active host.

In some embodiments, in order to provide the full attention of the user to the fact that it currently coupled to this specific host, all other keys of keyboard 100a are illuminated with the same color. In some embodiments, only some of the keys may be illuminated with this preset color. For example, only the alphanumeric keys 10 are illuminated or only control keys 20 or function keys 30 are illuminated.

FIG. 5B illustrates a KVM supporting keyboard 100b including an example of a standard keyboard arrangement 100 and an additional keyboard section 110b to support a KVM switch. Keyboard section 110b, in some embodiments of the invention, may include four keys 112 (keys with the same function as in keyboard section 110a) that select an active host. Keys 112 may be labeled by the digits '1'-'4'. In addition, keyboard section 110b may include a display 118 to indicate the KVM switch status. The statuses may be the state of the KVM switch such as power on, initial setup in process, error indication etc. Display 118 may indicate the number of the host that is currently active. Display 118 may be a seven-segment display. Display 118 may have a polychromatic background display that function in similar way as active host indicator 470 of remote control 400 that has been described hereinabove. In some embodiments of the invention, the position of keyboard section 110b may be in the right side of keyboard 100.

Keyboard 100b may include illuminated function keys 31. Illuminated function keys are similar to function keys 30 but includes polychromatic light source under these keys. Due to the location of function keys 31 illumination of this keys capture the attention of the users.

As in keyboard 100a, KVM control keys 112 may be illuminated by the polychromatic light source as well. Upon selection of the active host in the KVM switch, keys 31 and the appropriate key 112 are illuminated with the color associated with the active host computer. In some embodiments, display 118 displays in the same color. All other keys of keyboard 110b may be either illuminated or not illuminated. In some embodiments of the invention, all other keys of keyboard 110b are illuminated with a natural color, such as, white, yellow or blue to support well known in the art illumination for keyboard operation in dark condition. In some embodiments, these keys may be illuminated for a use in specific application. For example, some application may illuminate one or more letter keys to indicate their specific use in the application.

FIG. 5C illustrates yet another KVM supporting keyboard 100c including standard keyboard arrangement 100 and additional keyboard section 110c to support a KVM switch. In some embodiments of the invention, the position of keyboard section 110c is in the top side of keyboard 100. In addition to the keyboard section 110c, keyboard 100c in the same top row may include multimedia extension keyboard section 120. The keyboard section 120 may include keys such as pause, paly, fast forward, volume keys and a like. Alternatively, other keyboard extensions section or keys, e.g., such as gaming keyboard extension, may be integrated to keyboard 100c (or 100a, 100b). Keyboard section 110c in some embodiments of the invention, includes eight keys 112. Keys 112 are configured to select one active host out of 8 possible hosts coupled to the KVM switch. Keys 112 here, may function similar to keys 112 in sections keyboards 110a, 100b and keys 310x and 410x in the KVM switch and the remote control respectively. Keys 112 of keyboard section 110c may be labeled by the digits '1'-'8'. In addition, two indicators 114 and 116, similar to the ones in keyboard 100a, may be used to reflect statuses from the KVM switch.

Keyboard 100c includes an illuminated space key 12. Illuminated space key 12 includes polychromatic light source under the key. Due to the location of space key 12, illumination of the space key may capture the attention of the user. As in keyboard 100a, KVM switch control keys 112 may be illuminated by the polychromatic light source as well. Upon selection of the active host in the KVM switch, key 12 and the appropriate key 112 in keyboard section 110c may be illuminated with the color associated with the active host computer. All other keys of keyboard 110c may be either illuminated or non-illuminated keys.

In some embodiments of the invention, those keys may be illuminated with a natural color, such as, white, yellow or blue to support well known in the art illumination for keyboard operation in dark condition. In some embodiments, those keys may be illuminated for a use in specific application.

Figure 6:
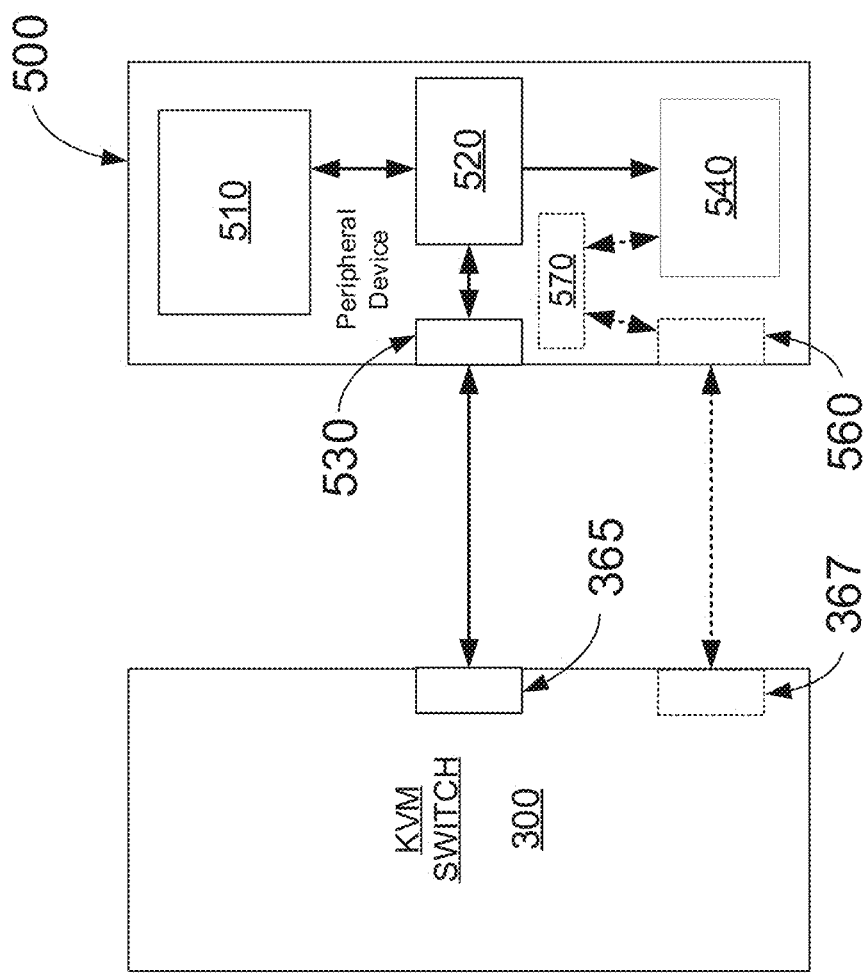
FIG. 6 is a schematic block diagram of a general peripheral device coupled to a KVM switch and supporting polychromatic indication in accordance with some embodiments of the present invention.

Reference is made now to FIG. 6. FIG. 6 is a schematic block diagram of a general peripheral device coupled to a KVM switch and supporting polychromatic indication in accordance with some embodiments of the present invention. A peripheral device 500 is coupled to a KVM switch 300 through interface 365 of KVM Switch 300 and interface 530 of peripheral device 500. Peripheral device may be any peripheral device including mouse, keyboard, microphone or any other peripheral devices mentioned hereinabove. The specific circuitry of each peripheral device is indicated by circuitry 510.

Circuitry 510 is controlled by controller 520. Controller 520 is coupled to interface 530 to receive command and communication from the active host through KVM switch 300, and to send peripheral device data to the active host through KVM switch 300. Peripheral device 500 further includes polychromatic indication 540 to illuminate in the color associated with the active host.

Additionally or alternatively, peripheral device 500 may be coupled using interface 560 to interface 367 of KVM switch 300. This connection may be used as a secondary communication channel dedicated to the polychromatic indication functionality. In some embodiments, the controller 570 may be used to control polychromatic indication 540 and to communicate with KVM switch 300 in this case.

In some embodiments of the invention, peripheral device 500 is a mouse and polychromatic indication 540 illuminates the mouse and/or the surface area around the mouse.

In some embodiments of the invention, peripheral device 500 is a microphone and the polychromatic indication 540 illuminates the microphone head whenever the microphone audio is open to the active host with the appropriate color (e.g., the indication is only active when the microphone is open for transmitting audio signals, for example, conditioned upon a push to talk button).

In some embodiments of the invention, peripheral device 500 is keyboard 100 and the polychromatic indication 540 illuminates one or more keys of keyboard 100 with the appropriate color.

In some embodiments of the invention, peripheral device 500 is smartcard reader and the polychromatic indication 540 illuminates the doorway into which the smartcard is inserted with the appropriate color.

In some embodiments, the KVM switch 300 may support some peripheral devices to be coupled to different host then the main KVM switch. For example, if an application in one host computer, e.g., host #1, needs the smartcard reader coupled to host #1 for the full process while the user wants during this time to switch and work with host #2, some KVM switch can allow this kind of operation. If host #1 is assigned to the red color and host #2 to the blue color. According some embodiments, the KVM switch may control the peripheral devices to illuminate in red, while the smartcard reader is controlled to illuminate in blue.

In some embodiments, the control command to illuminate in polychromatic light source by the KVM switch 300 is performed by transfer of a data sequence including 24-bit color data (8-bit R, 8-bit G and 8-bit G) each time an active channel is changed. Additionally or alternatively, KVM switch 300 may send the color assignment for the hosts from time to time (for example after reset and when color assignment is changed) and each device that has color illumination capability may set the appropriate color based on the stored color table data stored in the device's memory. The setup of colors assignment to the KVM switch may be performed in several ways.

First, a default setup may be stored in the KVM switch during manufacturing. After deployment the setup may be changed using setup session open with one of the host or setup session perform by a system administrator using an external laptop coupled to special setup interface in KVM switch 300. Yet setup may be done using the key shortcuts with the keyboard. For example, the key sequence 'Ctrl'+ 'Shift'+'1' followed by six hexadecimal digit key sequence may be used to associate host #1 with the color determined by 8 bit (two hexadecimal digits) for the red component, 8 bit for the green component and 8 bit for the blue component. For example, typing Ctrl+Shift+2, "800080" may assign a purple color, RGB (128, 0, 128), to host #2 of the KVM switch.

Figure 7:
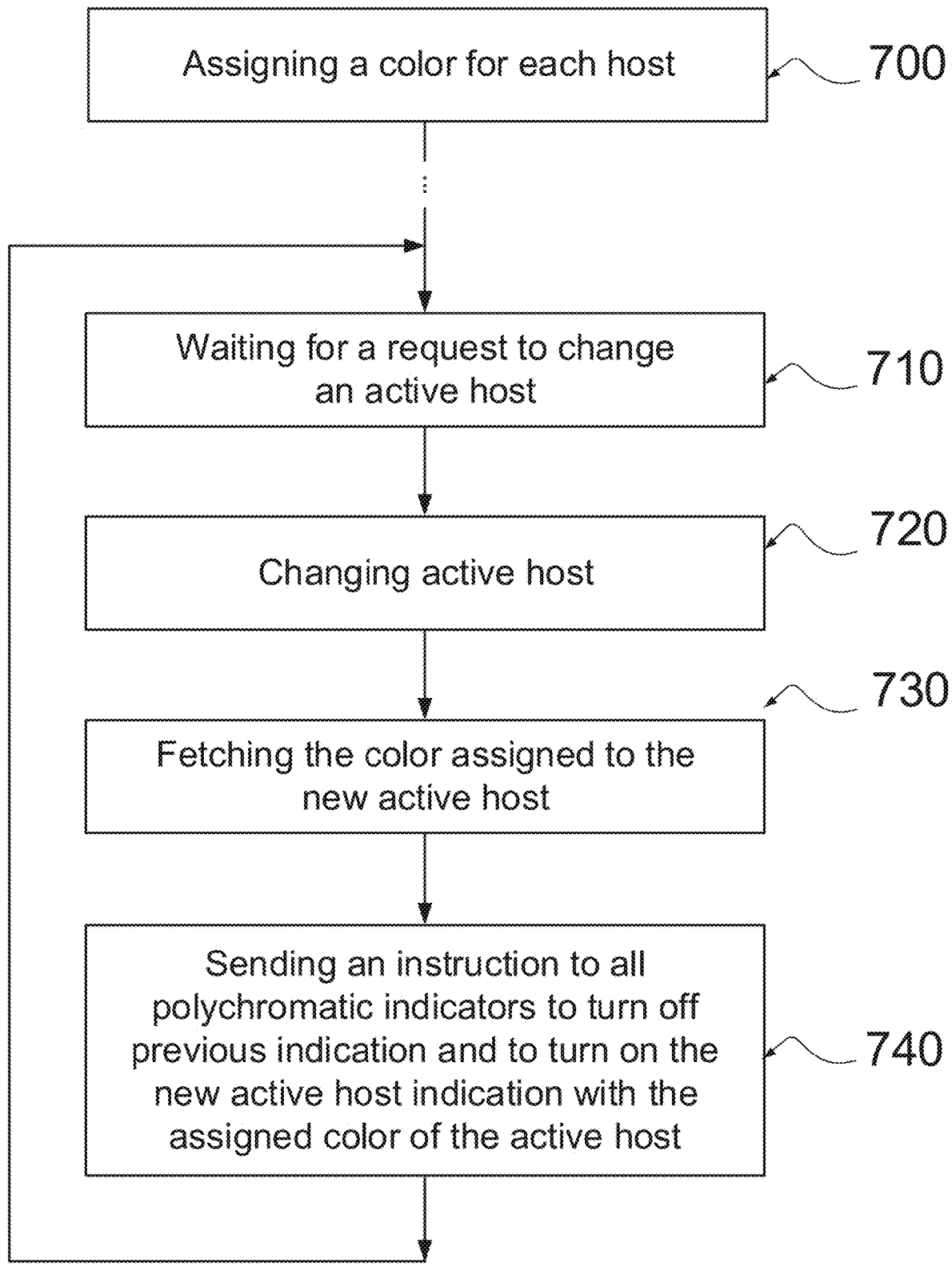
FIG. 7 is a flow chart of the KVM switch controller according to some embodiments of the present invention.

Reference is made now to FIG. 7. FIG. 7 is a flow chart of a method for that can be executed by the KVM switch controller according to some embodiments of the present invention.

In step 700 the controller can store for each host port of the KVM switch a color. The color may be assigned through several methods. The default assignment of colors to the hosts may be made in the factory. For example, a two-hosts KVM switch may be pre-set to a setup where host #1 assigned with green color and host #2 assigned with red color.

Additionally or alternatively, the setup can be changed dynamically during operation using a configuration port in the KVM switch. For example, a system administrator may couple his laptop to a special configuration interface or, for example, to the mouse USB port of the KVM switch, open a terminal connection, and in this special setup session, among other tasks, sets the color of each host in the system. Yet another option for the color-host assignment of the KVM switch, may be to set using a software running on one of the hosts in any time by the user. Color assignment may also be performed by typing key sequence from the keyboard (e.g., keyboard shortcuts).

In step 710, the KVM switch controller can wait for a request to change the active host from the user. The request event may come from several sources: key press in any device in the KVM system that have switching host keys such as 310x, 410x 112, and/or other switching host keys as are known in the art; keyboard and/or mouse shortcuts; and/or a mouse movement that crosses display boundaries in a single virtual display that includes several physical displays that can be driven from several hosts. After receiving the request to change the active host, in step 720, the KVM switch controller may perform the actual switching or the routing of the peripheral device to the new active host. Step 710-730 can include receiving from the user, a switching command, selecting an active host accordingly, and coupling the active host to the user's set of peripheral devices.

Next, in step 730 the KVM switch controller can fetch the color assigned to the new active host and in step 740 the KVM switch controller can update the indicators to the user by sending an instruction to all indicators that indicates the active host to the user. Steps 740 and 750 can indicate the active host to the user by illuminating in the color assigned to the active host computer. The indicators may be on the KVM switch enclosures, the KVM remote control enclosure, the keyboard or any other peripheral device coupled to the KVM switch. For all polychromatic indication the KVM switch may send with the instruction the color to be illuminated. In some embodiments, the color information for each active host is instructed in advance to each device with polychromatic indicator.

The communication between the KVM switch and the external indicators may be performed using a dedicated connection or an existing connection. For example, the connection with the remote control may be performed using RS232. The communication with a peripheral device may be performed using USB were the indicator is implemented as independent USB device in multidevice USB device were the other device is the HID device.

In some embodiments, the user awareness is increased for the host as he works with in a multi host environment and/or multi network environment and/or with multi security levels environment. Security breach by the user is prevented due to the association built in the user's mind between the color of the host and/or network and the security rules apply in each host and/or network. In some embodiments, the indication system includes a subsystem to ensure the color indication system is working properly. This may be performed by measuring the current consumption of each monochromatic light source in this subsystem and if the current consumption is not as expected, e.g., indication of a failure in the light source, the system may alert the user or the administrator or disable the indication system. Additionally or alternatively, a sensor based failure detection system may be used.

In some embodiments of the invention, a peripheral devices switching system configured to be coupled to a plurality of host computers includes: at least one set of peripheral devices; a peripheral devices switch, e.g., KVM switch 300, and one or more polychromatic light sources. The peripheral devices switch 300 can be configured to be coupled to said at least one set of peripheral devices and said plurality of host computers, where the peripheral devices switch assigns a color to each host computer of the plurality of host computers, and the peripheral devices switch 300 couples between said at least one set of peripheral devices and an active host computer of the plurality of host computers. The one or more polychromatic light sources can be included in the peripheral devices switch, the at least one of the peripheral devices of the sets of peripheral devices or both. The peripheral devices switch 300 can indicate the active host computer by, for example, illuminating at least one of or a combination of the light sources by the color that is assigned to the active host computer.

Figure 8:
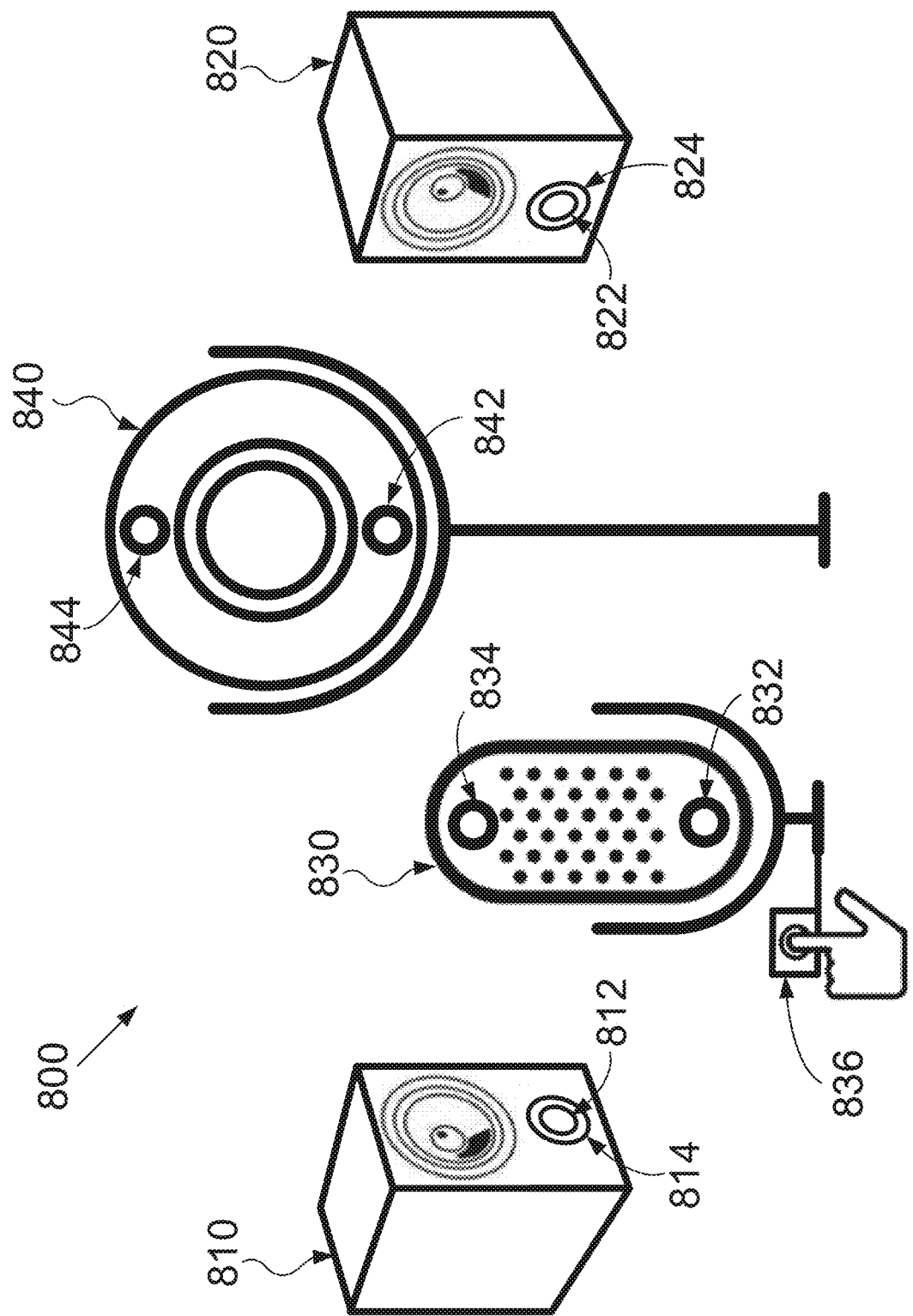
FIG. 8 is an illustration view of a set of multimedia peripheral devices in accordance with some embodiments of the present invention.

Reference is made now to FIG. 8. FIG. 8 is an illustration view of a set of multimedia peripheral devices 800 coupled to a KVM switch 300 and supporting polychromatic indication in accordance with some embodiments of the present invention. The set of multimedia peripheral devices 800 comprises of left speaker 810, right speaker 820, microphone 830, and camera 840. Left speaker 810, right speaker 820, microphone 830, and camera 840 are all connected to KVM switch 300 (for clarity these connections are not shown in the illustration). The peripheral may use interfaces similar to interfaces 530 and 560 described hereinabove. Speakers 810 and 820 receive through the interfaces a stereo audio stream to be played by the speaker. Audio stream may be in digital format or analog format. In addition, speakers 810 and 820 receive from the KVM switch 300 commands to illuminate polychromatic indicators 812, 814, 822, 824. polychromatic indicator 812 is illuminate in the color associated with the active host whenever the speaker is connected to the active host. Polychromatic indicator 814 is illuminate in the color associated with the active host whenever an active signal is transmitted to the speaker. In an exemplary embodiment of the invention, only polychromatic indicator 812 or polychromatic indicator 814 is provided. Alternatively, indicator 812 or indicator 814 may be monochromatic indication while the other indication is polychromatic indication. In an exemplary embodiment of the invention, Polychromatic indicator 814 illuminates the area around the polychromatic indicator 812 which provide a native illustration for the speaker activity. Polychromatic indicator 822 and 824 act in similar way as Polychromatic indicator 812 and 814.

Microphone 830 transmit audio signals captured by the microphone to KVM switch 300. From KVM switch 300 the audio signal may be transferred to an active host. Audio stream may be in digital format or analog format. Microphone 830 comprises polychromatic indicator 832 configured to be illuminate whenever microphone 830 is connected to an active host with the color associated with the active host. This indication, 832, only indicate to the user that if the microphone will be opened which host will receive the sensed audio signal of the microphone. To actually open the microphone circuitries to transmit an audio signal, a push to talk button 836 is provided. Conditioned upon pressing the push to talk button 836, the microphone transmits the audio signal to KVM switch 300. To indicate that the microphone is open for transmitting audio signals, indication, 834 illuminates in the color associated with the active host.

Camera 840 transmit video signals captured by the camera to KVM switch 300. From KVM switch 300 the video signal may be transferred to an active host. Camera 840 comprises polychromatic indicator 842 configured to be illuminate whenever camera 840 is connected to an active host with the color associated with the active host. This indication, 842, only indicate to the user that if the camera will be opened, which of the hosts will receive the video signal. When the camera transmits the video signal to KVM switch 300, in order to indicate the user that an active video stream is transmitted, indication, 834 illuminates in the color associated with the active host.

In an exemplary embodiment of the invention, indicators 832 and 834 or indicator 842 and 844 are collocated with indicator 834 or indicator 844 are surrounding indicator 832 or indicator 842 respectively. In an exemplary embodiment of the invention, only polychromatic indicator 832 or polychromatic indicator 834 is provided. Alternatively, indicator 832 or indicator 834 may be monochromatic indication while the other indication is polychromatic indication. In an exemplary embodiment of the invention, only polychromatic indicator 842 or polychromatic indicator 844 is provided. Alternatively, indicator 842 or indicator 844 may be monochromatic indication while the other indication is polychromatic indication.

Figure 9:
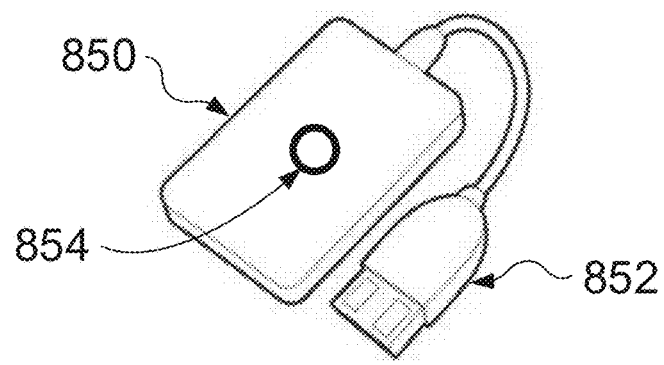
FIG. 9 is an illustration view of an external disk device supporting polychromatic indication in accordance with some embodiments of the present invention.

Reference is made now to FIG. 9. FIG. 9 is an illustration view of an external disk device 850 coupled to a KVM switch 300 and supporting polychromatic indication in accordance with some embodiments of the present invention. External disk device 850 is connected to KVM switch 300 using USB connector 852. External disk device 850 comprises polychromatic indicator 854. In prior art external disk devices, the indication is used to indicate whenever there is an active read or write transaction with device 850. According to the present invention, whenever there is an active read or write transaction with device 850 polychromatic indicator 812 is illuminate in the color associated with the active host. The USB bus is used both to transfer the read/write data for the disk as well as the polychromatic illumination command. In an exemplary embodiment of the invention, composite device USB interface is used and the disk is one USB device that communicate with the active host while the polychromatic indicator has a controller which is another USB device and both devices share the same USB bus.

Figure 10:
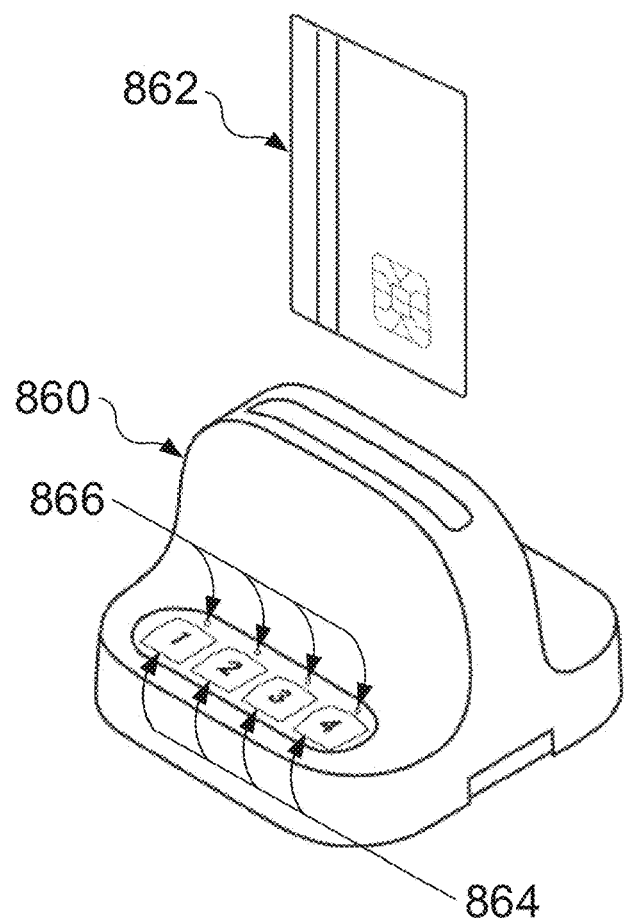
FIG. 10 is an illustration view of a multi-domain smart-card reader coupled to a plurality of hosts and supporting polychromatic indication in accordance with some embodiments of the present invention.

Reference is made now to FIG. 10. FIG. 10 is an illustration view of a multi-domain smart-card reader 860 coupled to a plurality of hosts 250 and supporting polychromatic indication in accordance with some embodiments of the present invention. Multi-domain smart-card reader 860 is a card reader that is configured to accept smart-card 862 that is used to identify and authenticate a user to a plurality of hosts 250. Multi-domain smart-card reader 860 may be connected to KVM switch 300 that provide the coupling to the plurality of hosts 250 or may integrate the KVM switch (i.e., the card reader peripheral switch) inside the multi-domain smart-card reader 860 enclosure. Upon entering card 862 to multi-domain smart-card reader 860 card slot the user may authenticate himself in front of one of the hosts that supported by the multi-domain smart-card reader 860 (in this exemplary embodiment four hosts are supported). To authenticate to each of the hosts 250, the user needs to press one of the push-buttons 864. Upon successful authentication the corresponding indicator 866 will illuminate in the color associated with the authenticating host. Multi-domain smart-card reader 860 may keep coupling with a single card to several host simultaneously. Each one of indicator 866 will illuminate in the color associated with the corresponding host. To discard authentication from a specific host, the user may press one of the push-buttons 864 again. The corresponding indicator 866 will turn off. Upon removing smart-card 862 from multi-domain smart-card reader 860, all authentication with the host will be discarded.

Figure 11:
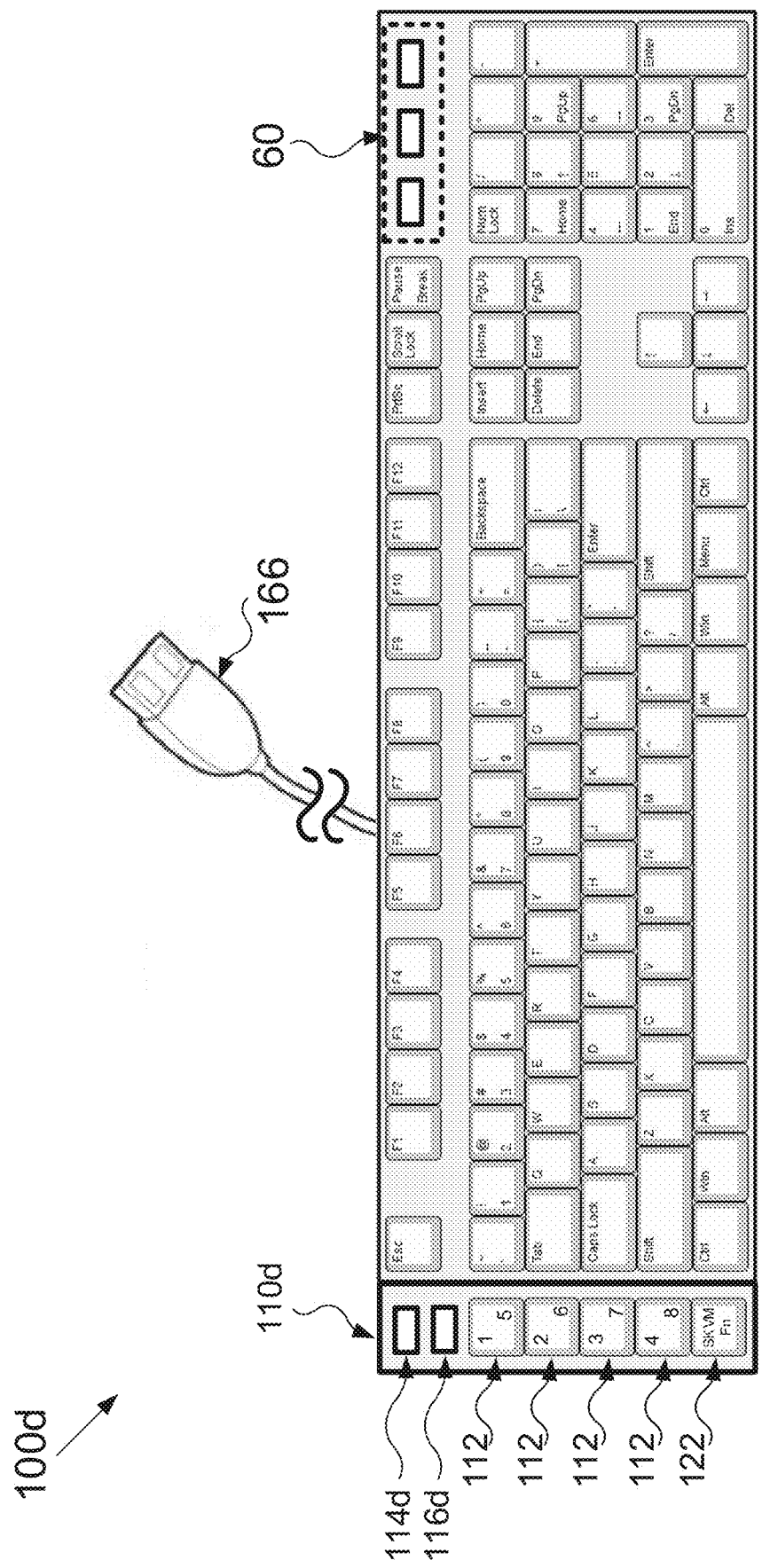
FIG. 11 is an illustration of another variant of keyboard that support a KVM switch, in accordance with some embodiments of the invention.

Reference is made now to FIG. 11. FIG. 11 is an illustration of another keyboard 100*d* with KVM switch support. As in previous embodiment of such a keyboard 100*a*, 100*b* and 100*c* there are additions keys and indicators to the standard keyboard including four KVM control keys 112 that are configured to select active host 250, KVM control key 122 that is special KVM function key, and indicators 114*d* and 116*d* that are used to indicate special peripheral status of devices connected to the KVM switch that is connected to keyboard 110*d*. Key 122 may be used to extend the selection of the active hosts from four to eight in the following way. For selecting hosts #1 to host #4 the user presses on one of keys 112. The digit 1-4 over the upper left side of keys 112 cap is illuminated with the color assigned to the corresponding host computer. For selecting hosts #1 to host #8 the user presses on key 122 and then on one of keys key 112. The digit 5-8 over the lower right side of keys 112 cap is illuminated with the color assigned to the corresponding host computer 250. Other functions may be assigned to key 112 by sequences of multiple presses, long press or simultaneous press with other keys.

Indicators 114*d* and 116*d* may be used to indicate the connection status of a specific peripheral devices that are connected to the KVM switch. For example, indicator 114*d* may be used to indicate by illuminating with the color associated with host 250 that a card reader is authenticated with and indicator 116*d* may be used to indicate by illuminating with the color associated with host 250 that a speaker is connected to be the KVM switch.

Interface 166, illustrated in the figure by a cable and a connector, is implementing the interface between KVM switch 300 and keyboard 100*d*. As illustrated in FIG. 6 and the accompanying text in the description, this interface may be split to two different communication interfaces: (1) a standard communication from the peripheral to the host, and (2) an additional, extended functionality, communication between the KVM switch 300 and keyboard 100*d*. This additional communication interface may be used to provide security functions to lock indicators 60.

Some secure KVM switches, for example, the ones that are certified to protection security profile of National Information Assurance Partnership (NIAP), blocks the lock keys status commands that are sent by the host in response to lock keys press events and are intent to indicate the lock keys status by lock indicators 60. This blocking is done since sending the lock keys status commands violates the security policy of having the keyboard device a unidirectional device that only transmit data from the keyboard to the hosts. As will be seen next, having two separated interfaces: one for the standard keyboard, and another one for the communication between the KVM switch and the keyboard, provide a solution for relaxation of this lock indication blocking requirement.

In an exemplary embodiment of the invention, interface 166 may be USB. Optionally, the USB interface may be composite device comprises two USB devices transferring data on the same USB bus, connectors and cable. Alternatively, interface 166 may be two completely separate communication protocols, optionally, running over the same cable and connectors. For example, the keyboard may use USB Type C connector which have standard USB data pin and additional high-speed data pins that can be used out of the standard as the additional extended functionality communication between the KVM switch and the keyboard.

Figure 12:
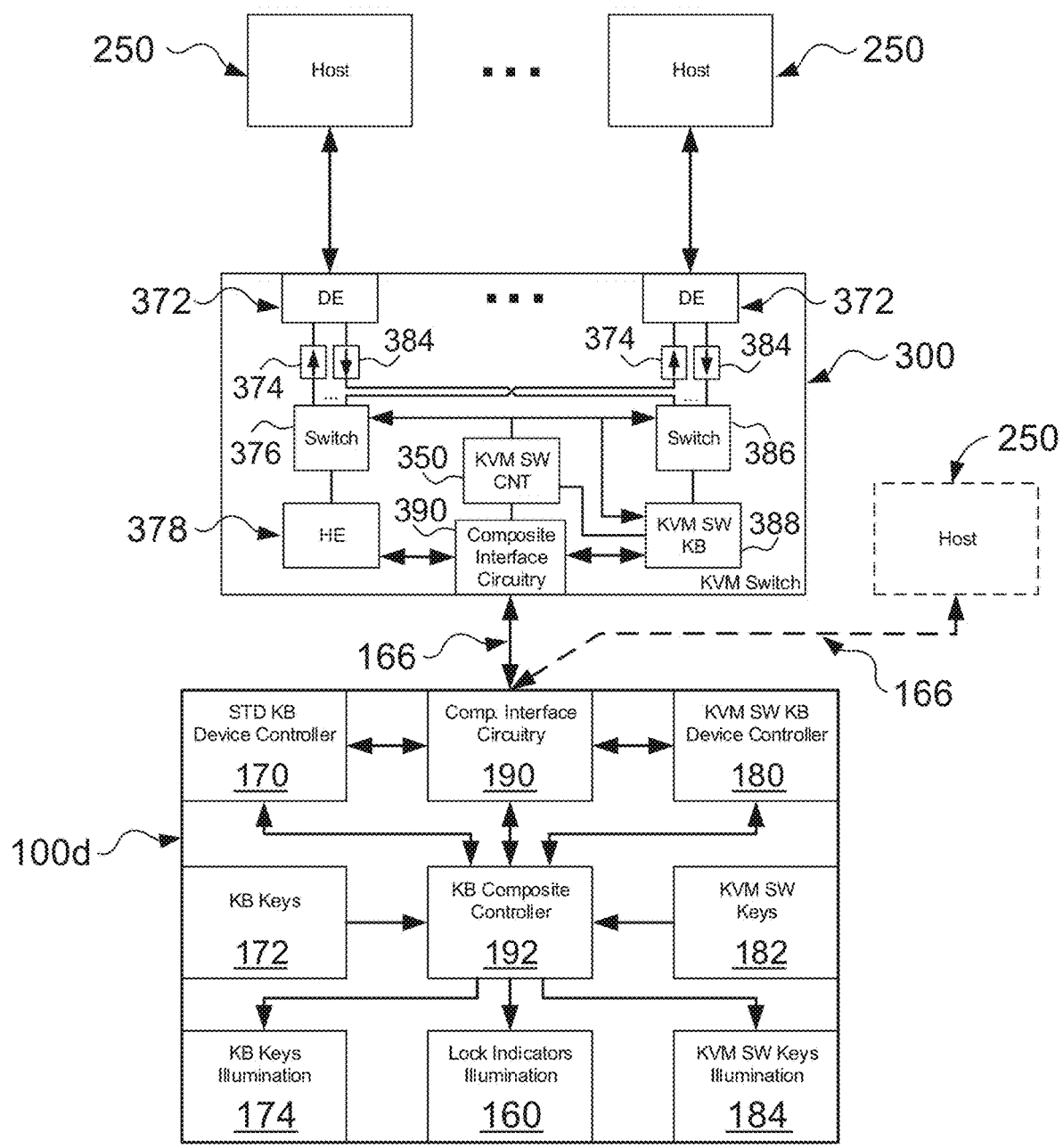
FIG. 12 is a block diagram of the keyboard in FIG. 11 with support of interface separation between the standard keyboard functionality and the KVM switch support functionality in accordance with some embodiments of the present invention It will be appreciated that for simplicity and clarity of illustration, elements shown in the figures have not necessarily been drawn to scale. For example, the dimensions of some of the elements may be exaggerated relative to other elements for clarity. Further, where considered appropriate.

Reference is made now to FIG. 12. FIG. 12 is a block diagram of a keyboard 100*d* with support of interface separation between the standard keyboard functionality and the KVM switch support functionality in accordance with some embodiment of the present invention. Keyboard 100*d* is connected to KVM switch 300 using interface 166 (illustrated in FIG. 10 too). In an exemplary embodiment of the invention, interface 166 is USB communication protocol. In some embodiment, the USB cable and USB connector are of USB 2.X protocol and the connector type is USB type A. Alternatively, USB cable and connector are of USB 3.X protocol and the connector type is USB type C. Additionally or alternatively, other USB protocol and non-USB protocol are used and other type of connectors are used as well. KVM switch 300 is connected to a plurality of host 250. Alternatively, Keyboard 100*d* may be connected directly to host 250 as illustrated in dashed lines in FIG. 11. Keyboard 100*d* comprises nine elements: standard keyboard device controller 170, standard keyboard keys 172, keyboard keys illumination elements 174, KVM switch keyboard device controller 180, KVM switch keys 182, KVM switch keys illumination elements 184, composite interface circuitry 190, keyboard composite controller 192, and lock indication illumination elements 160.

When the keyboard is connected directly to host 250, keyboard 100*d* act as a standard keyboard. Composite interface circuitry 190 detect that keyboard 100*d* is connected directly to host 250 so composite interface circuitry 190 instructs keyboard composite controller 192 to give full control in keys (172, 182) and illumination elements (174, 184, 160) to standard keyboard device controller 170. In this mode of operation, the keyboard act as a standard keyboard. Standard keyboard device controller 170 can scan keyboard keys 172 and upon press, i.e., make or break key events the standard keyboard device controller 170 sends the appropriate command to host 250 through composite interface circuitry 190 and interface 166. Composite interface circuitry 190 performs transparent (non-composite) transfer, and interface 166 in this case is carrying a single keyboard device interface, e.g., standard USB HID KB device.

Polychromatic illumination functionality under the standard keys (illumination elements 174) is also coupled by keyboard composite controller 192 to standard keyboard device controller 170. With proper software support in host 250. Host 250 can control the illumination in general and the color under each key, in specific. For example, some game application may use it to indicate "hot keys" for game control. Lock indication illumination elements 160 is the embodiment of the indication 60 in FIG. 11. Lock indication illumination elements 160 may be implemented using polychromatic light sources. In the case of direct connection between keyboard 100*d* and host 250, keyboard composite controller 192 couples the lock indication illumination elements 160 to standard keyboard device controller 170 as well. In this case, the lock keys status commands from host 250 that comes as a response of pressing the lock keys (caps lock, num lock, scroll lock) will cause standard keyboard device controller 170 to illuminate lock indication illumination elements 160 with a default color, typically green or white.

KVM switch keys 182 are embodiment of keys 112 and 122 of keyboard 100*d* or keys 112 of keyboards 100*a*, 100*b* and 100*c*. KVM switch keys illumination elements 184 are embodiment of polychromatic illumination over keys 112 and 122 as well as indicator 114*d* and 116*d* of keyboard 100*d* and indicators 114, 116 and 118 of keyboard 100*a*, 100*b* and 100*c*. KVM switch keys 182 and the corresponding KVM switch keys illumination elements 184 may be used, with proper software support as keyboard extensions such as multimedia or gaming extension keys. Keyboard composite controller 192 couples KVM switch keys 182 and KVM switch keys illumination elements 184 to standard keyboard device controller 170 as well and upon pressing these keys, standard keyboard device controller 170 send command to host 250 and upon host 250 illumination commands to standard keyboard device controller 170, the elements is illuminated, optionally, by polychromatic color. During direct keyboard to host connection KVM switch keyboard device controller 180 is disabled.

When composite interface circuitry 190 detects a connection to KVM switch 300, keyboard 100*d* behave differently, this different keyboard behavior, refers as "KVM switch mode".

In keyboard's KVM switch mode, composite interface circuitry 190 instructs keyboard composite controller 192 to split the responsibility of sensing, i.e., scanning the keys, between standard keyboard device controller 170 and KVM switch keyboard device controller 180. Keyboard keys 172 are scanned by standard keyboard device controller 170 and KVM switch keys 182 by KVM switch keyboard device controller 180. Composite interface circuitry 190 gets the keys press events commands, i.e., key make and break commands of keyboard keys 172, from standard keyboard device controller 170 and the keys make and break commands of KVM switch keys 182 from KVM switch keyboard device controller 180. In an exemplary embodiment of the invention, composite interface circuitry 190 open two devices i.e., composite device on interface 166, alternatively, composite interface circuitry 190 communicate through two independent interfaces with KVM switch 300. With regards to the indications, i.e., illumination elements (174, 160 and 184), composite interface circuitry 190 instructs keyboard composite controller 192 to couple the indication elements to KVM switch keyboard device controller 180. This coupling allows KVM switch 300 to give the user a color indication regarding the active host as described in the embodiments of FIG. 5A-FIG. 5C described hereinabove. In addition, this coupling enables a secure KVM switch to control the lock indication illumination elements 160 (i.e., lock indicators 60) in a secure manner as will be explained hereinafter. For keys 112 in KVM switch keys 182, KVM switch keyboard device controller 180 only illuminates, in the color associate with the active host, the key corresponding to the active host, or in the case were the key 112 is used for selecting two or more hosts, only portion area of the key. For example, for the top key 112 labeled with '1' and '5' when host #1 is the active (selected) host, only the area under the label '1' (top-left) will be illuminated with the color associated with host #1, while when host #5 is the active (selected) host, only the area under the label 5 (bottom-right) will be illuminated with the color associated with host #5. Dissimilar to the illumination of the other keys, in keys 112 only one key, or area on the key, is illuminated while the other keys 112, e.g., keys ('2'+'6', '3'+'7' and '4'+'8') are not illuminated.

For security reasons, lock indication illumination elements 160 in keyboard's KVM switch mode may be controlled by KVM switch keyboard device controller 180. Composite interface circuitry 190 instructs keyboard composite controller 192 to couple lock indication illumination elements 160 to KVM switch keyboard device controller 180. In this KVM switch mode, while lock keys (Caps Lock, Num Lock, Scroll Lock) make and break events are transmitted to host 250 through standard keyboard device controller 170, the lock keys status commands from host 250, i.e., the commands for lock keys states that targeted to be displayed by lock indication illumination elements 160 may returned to keyboard 100*d* through different interface path. In this path, the lock keys status commands transferred to KVM switch keyboard device controller 180. Unlike in keyboard-host direct connection, KVM switch keyboard device controller 180 may illuminate the lock indication illumination elements 160 with polychromatic color that is associated with the active host. To complete the picture, reference is made now to the internal block diagram of the KVM switch 300. The communication between keyboard 100*d* and KVM switch 300 is accomplished between composite interface circuitry 190 of the keyboard and composite interface circuitry 390 of the KVM switch. In an exemplary embodiment of the invention, both sides are communicating using logical level composite device protocol such as USB. Alternatively, complete independent interfaces are used, optionally, over the same cable and connector. For example, USB type C connectors might be used but both keyboard 100*d* and KVM switch 300 may use some of the non-mandatory USB pins, such as high-speed data pins to run a separate communication interface between a keyboard controller 388 in KVM switch 300 and KVM switch keyboard device controller 180 in keyboard 100*d*. Inside KVM switch 300 data, commands, or messages that was initiated by standard keyboard device controller 170 will be transferred by composite interface circuitry 390 to a host emulator 378. Host emulator can communicate bidirectional with standard keyboard device controller 170 but can only send the keypress commands, i.e., the make and break events of the keys of the keyboard, to the active host 250. This is done through switch 376 that selects the active host 250 and a unidirectional enforcing element 374 that transfer data only from host emulator 378 to a device emulator 372 that is connected to the active host. Active host 250 is communicate bidirectionally with device emulator 372 so that device emulator 372 may get the responses for lock keys press events, i.e., the lock keys status commands that are needed for setting of lock indication illumination elements 160. However, since device emulator 372 cannot communicate back with host emulator 378, device emulator 372 may communicate the lock keys status commands through a unidirectional enforcing element 384 and switch 386 to keyboard controller 388. Keyboard controller 388 using the composite or separate interface between composite interface circuitry 190 in KVM switch 300 and composite interface circuitry 190 in keyboard 100*d* may communicate the lock keys status commands, that are the responses for lock keys presses, to KVM switch keyboard device controller 180. Whenever enhanced cyber security for this functionality is required, device emulator 372 may create internally three signals on three wires, one for each lock indication. The first wire signals the Caps Lock state, the second wire signals the Num Lock state and the third wire signals the Scroll Lock state. These three signals from the device emulator, that is connected to the active host, are selected by switch 386 and go separately via point-to-point hardware wiring, switching or routing through keyboard controller 388, composite interface circuitry 390, composite interface circuitry 190, KVM switch keyboard device controller 180, and keyboard composite controller 192 to control lock indication illumination elements 160. In other embodiments, the lock indication response goes through keyboard controller 388 to composite interface circuitry 390 that using the appropriate bus through the composite interface send the lock indication response to composite interface circuitry 190 that in its turn forward it to KVM switch keyboard device controller 180 that controls lock indication illumination elements 160, optionally, with the appropriate color assigned to the active host.

KVM switch 300 also comprises KVM switch controller 350 (illustrated previously in FIG. 5) that set the active host 250 using at least key presses over keys 310*a*-310*d* on KVM switch 300 or key presses on keys 122 on keyboards 100*a*-100*d*. The active host 250 selection is provided simultaneously to switch 376, switch 378, and keyboard controller 388. Keyboard controller 388 transfer the active host data to KVM switch keyboard device controller 180 that control the feedback to the user using the polychromatic light sources in keyboard keys illumination elements 174, lock indication illumination elements 160 and KVM switch keys illumination elements 184.

In an exemplary embodiment of the invention, keyboard 100*d* comprise composite device. Lock keys make and break events are transferred from the keyboard through the KVM switch to the host 250 using a first device and the lock keys status commands are received from the host 250 through KVM switch 300 to the keyboard using a second device. Alternatively, keyboard 100*d* comprise two separate devices. The lock keys make and break events are transferred from keyboard to host through KVM switch using a first device and the responses are received from the KVM switch to the keyboard using a second device.

The terms "comprises", "comprising", "includes", "including", "having" and their conjugates mean "including but not limited to".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

While certain features of the invention have been illustrated and described in conjunction with specific embodiments thereof, it is evident that many alternatives, modifications, variations, substitutions, changes, and equivalents will be apparent to those skilled in the art. It is, therefore, to be understood that the appended claims are intended to embrace all such alternatives, modifications, variations, substitutions, changes, and equivalents as fall within the true spirit and broad scope of the invention.

Various embodiments have been presented. Each of these embodiments may of course include features from other embodiments presented, and embodiments not specifically described may include various features described herein.

The invention claimed is:

1. A keyboard configured to be coupled with a KVM switch, the keyboard comprising:
   a plurality of keyboard keys;
   a plurality of illumination elements;
   a standard keyboard device controller;
   a KVM switch keyboard device controller; and
   a composite interface configured to enable communication between the keyboard device controller and the KVM switch, and between the KVM switch keyboard device controller and the KVM switch,
   wherein the standard keyboard device controller is configured to send to the KVM switch events of keypresses on the plurality of keyboard keys,
   the KVM switch keyboard device controller is configured to receive instructions from the KVM switch, and
   in response to said instructions, the KVM switch keyboard device controller activates the plurality of illumination elements.

2. The keyboard of claim 1, wherein at least one of the illumination elements of the plurality of illumination elements is polychromatic elements.

3. The keyboard of claim 2, wherein one or more of the polychromatic elements are configured to indicate an active host computer by a color assigned with the active host computer.

4. The keyboard of claim 2, wherein the KVM switch keyboard device controller receives messages or commands through the composite interface from the KVM switch on event of switching active host, said messages or commands comprise color information.

5. The system of claim 2, wherein the one or more polychromatic illumination elements comprises Red-Green-Blue (RGB) LEDs.

6. The keyboard of claim 1, wherein some of the plurality of illumination elements are located under or adjacent to one or more keys of said keyboard and are associated with said one or more keys.

7. The keyboard of claim 1, wherein said plurality of keyboard keys comprises any one of or any combination of (a) Latin letters (a-z) keys, (b) digit keys, (c) punctuation keys, (d) symbol keys, (e) control keys, (f) function keys, (g) navigation keys, (h) numeric keypad keys, and (i) any non-Latin letter keys.

8. The keyboard of claim 1, wherein said plurality of keyboard keys complies with ISO/IEC 9995 keyboard standard series.

9. The keyboard of claim 1, wherein the keyboard further comprises one or more KVM control keys, wherein the KVM switch keyboard device controller is configured to send to the KVM switch events of keypresses on the one or more KVM control keys.

10. The keyboard of claim 9, wherein the one or more KVM control keys are configured to select an active host by the KVM switch.

11. The keyboard of claim 10, wherein the composite interface that enables communication between the KVM switch keyboard device controller and the KVM switch comprises three wires that carry the lock keys status commands, wherein a first of said three wires signals a Caps Lock state, a second of said three wires signals a Num Lock state, and a third of said three wires signals a Scroll Lock state.

12. The keyboard of claim 1, wherein the keyboard further comprises lock keys and lock indicators and wherein the standard keyboard device controller is configured to send to the KVM switch events of keypresses on the lock keys, and the KVM switch keyboard device controller is configured to receive lock keys status commands from the KVM switch, and in response to said lock keys status commands the KVM switch keyboard device controller activates the lock indicators.

13. The keyboard of claim 12, wherein the composite interface is USB.

14. The keyboard of claim 1, wherein the composite interface is a single interface protocol configured to aggregate a plurality of devices.

15. The keyboard of claim 1, wherein the composite interface comprises two independent interface protocols either by sharing a single connector and cable but having separate pins in the connectors and corresponding wires in the cable or by having a separate cable and separate connector to each one of said two independent interface protocols.

16. The keyboard of claim 1, wherein the composite interface comprises a circuitry to detect when the keyboard is connected to a KVM switch supporting composite interface or directly to a host computer that supports communication only with the standard keyboard device controller, and in response to detecting said direct keyboard to host connection, a keyboard composite controller disables the KVM switch keyboard device controller and couples at least the plurality of illumination elements to the standard keyboard device controller.

17. The keyboard of claim 1, wherein the keyboard further comprises a keyboard composite controller that couples the plurality of keyboard keys and the plurality of illumination elements either to the standard keyboard device controller, or to the KVM switch keyboard device controller.

18. A peripheral devices switch, configured to couple between a plurality of host computers and one or more peripheral devices, wherein at least one peripheral device comprises one or more polychromatic light sources, the peripheral devices switch comprises:
a plurality of host interfaces, each of said plurality of host interfaces being configured to be connected to a respective one of the plurality of host computers;
one or more peripheral device interfaces, each of said one or more peripheral device interfaces being connected to a respective one of the one or more peripheral device;
a switching circuitry; and
a controller,
wherein
the controller is configured to receive a color assigned to each of the plurality of host computers,
the controller is configured to receive a switching command that indicates a particular host computer of the plurality of host computers to be coupled to the at least one peripheral device, wherein the particular host computer comprises an active host computer,
in response to the switching command, the controller instructs the switching circuitry to couple the host interface of the plurality of host interfaces that is connected to the active host computer to one of the one or more peripheral device interfaces, and
in response to the switching command, the controller instructs to at least one peripheral device, through the one or more peripheral device interfaces, to illuminate the one or more polychromatic light sources in order to indicate the active host computer, wherein the illumination is with the color assigned to the active host computer.

19. The peripheral devices switch of claim 18, wherein at least one of the peripheral device interfaces is a composite interface with a standard peripheral device interface for the standard peripheral device functionalities, and a dedicated peripheral device interface configured to instruct the illumination of the polychromatic indication.

20. The peripheral devices switch of claim 19, wherein at least one of the peripheral device interfaces is USB.

21. The peripheral devices switch of claim 20, wherein the USB interface is a composite device interface over the USB, and wherein the standard peripheral device interface is a USB standard peripheral device protocol and the dedicated peripheral device interface is a secondary USB device, over the same USB, that is used to instructs the illumination of the polychromatic indication.

22. The peripheral devices switch of claim 19, wherein the composite interface comprises two independent interface protocols either by sharing a single connector and cable but having separate pins in the connector and corresponding wires in the cable, or by having a separate cable and separate connector to each one of said two independent interface protocols.

23. The peripheral devices switch of claim 19, wherein the peripheral devices switch is a KVM switch (Keyboard, Video, and Mouse switch).

24. The peripheral devices switch of claim 19, wherein at least one of the peripheral devices is a keyboard.

25. The peripheral devices switch of claim 24, wherein one of the peripheral device interface connected to the keyboard is a composite interface with a standard peripheral device interface for keyboard functionalities, and a dedicated peripheral device interface configured to instruct the illumination of the polychromatic indication.

26. The peripheral devices switch of claim 24, wherein the secondary dedicated peripheral device interface comprises three wires that carry keyboard lock keys status commands.

27. A peripheral device configured to be connected to a peripheral device switch that is coupled to a plurality of host computers, the peripheral device comprises:
 a peripheral device interface;
 one or more polychromatic light sources; and
 a controller,
  wherein the controller is configured to receive instructions from the peripheral device switch to illuminate the one or more polychromatic light sources in order to indicate one of the plurality of host computers, wherein the illumination is with a color assigned to said one of the plurality of host computers.

28. The peripheral device of claim 27, wherein the peripheral device is a microphone, a camera, a speakerphone, or headset.

29. The peripheral device of claim 28, wherein the peripheral device further comprises a push button to enable manual coupling of the peripheral device to one of the plurality of host computers, and the peripheral device illuminates at least one of the one or more polychromatic light sources, with the color assigned with said one of the plurality of host computers, in response to said manual coupling being activated.

30. The peripheral device of claim 27, wherein the peripheral device is an external hard disk, a smart-card reader, a Common Access Card (CAC) reader, biometric reader, printer, scanner, or peripheral device with USB interface.

31. The peripheral device of claim 27, wherein the peripheral device is a multi-domain smart-card reader wherein the multi-domain smart-card reader may simultaneously authenticate a smart-card holder in front of two or more of the plurality host computers and for each authenticated host computer one or more polychromatic light sources are illuminated with the color assigned with the corresponding host computer.

32. The peripheral device of claim 27, wherein the peripheral device interface is a composite interface with a primary standard peripheral device interface for standard peripheral device functionalities, and a secondary dedicated peripheral device interface configured to receive instructions for illumination of the one or more polychromatic light sources.

33. The peripheral device of claim 32, wherein the composite interface is USB with composite devices.

* * * * *